(12) United States Patent
Tummala et al.

(10) Patent No.: US 7,035,881 B2
(45) Date of Patent: Apr. 25, 2006

(54) ORGANIZATION OF READ-WRITE SNAPSHOT COPIES IN A DATA STORAGE SYSTEM

(75) Inventors: Himabindu Tummala, South Grafton, MA (US); Philippe Armangau, Acton, MA (US)

(73) Assignee: EMC Corporation, Hopkinton, MA (US)

( * ) Notice: Subject to any disclaimer, the term of this patent is extended or adjusted under 35 U.S.C. 154(b) by 233 days.

(21) Appl. No.: 10/668,783

(22) Filed: Sep. 23, 2003

(65) Prior Publication Data

US 2005/0065985 A1 Mar. 24, 2005

(51) Int. Cl.
*G06F 17/30* (2006.01)

(52) U.S. Cl. ...................... 707/204; 707/205
(58) Field of Classification Search ............. 707/201, 707/200, 203, 204; 714/6; 711/154, 159; 717/162, 112

See application file for complete search history.

(56) References Cited

U.S. PATENT DOCUMENTS

| | | | |
|---|---|---|---|
| 4,686,620 A | 8/1987 | Ng | 364/200 |
| 4,755,928 A | 7/1988 | Johnson et al. | 364/200 |
| 5,060,185 A | 10/1991 | Naito et al. | 364/900 |
| 5,434,994 A | 7/1995 | Shaheen et al. | 395/500 |
| 5,535,381 A | 7/1996 | Kopper | 395/600 |
| 5,596,706 A | 1/1997 | Shimazaki et al. | 395/182.04 |
| 5,673,382 A | 9/1997 | Cannon et al. | 395/182.04 |
| 5,742,792 A | 4/1998 | Yanai et al. | 395/489 |
| 5,819,292 A | 10/1998 | Hitz et al. | 707/203 |
| 5,829,046 A | 10/1998 | Tzelnic et al. | 711/162 |
| 5,829,047 A | 10/1998 | Jacks et al. | 711/162 |
| 5,835,953 A | 11/1998 | Ohran | 711/162 |
| 5,893,140 A | 4/1999 | Vahalia et al. | 711/118 |
| 5,915,264 A | 6/1999 | White et al. | 711/168 |
| 5,974,563 A | 10/1999 | Beeler, Jr. | 714/5 |
| 6,035,412 A | 3/2000 | Tamer et al. | 714/6 |
| 6,061,770 A | 5/2000 | Franklin | 711/162 |
| 6,076,148 A | 6/2000 | Kedem | 711/162 |
| 6,101,497 A | 8/2000 | Ofek | 707/10 |
| 6,269,431 B1 | 7/2001 | Dunham | 711/162 |
| 6,279,011 B1 | 8/2001 | Muhlestein | 707/204 |
| 6,324,581 B1 | 11/2001 | Xu et al. | 709/229 |
| 6,434,681 B1 | 8/2002 | Armangau | 711/162 |

(Continued)

OTHER PUBLICATIONS

EMC Celerra SE5 File Server, EMC Corporation, Hopkinton, Mass. 01748-9103, 2002, 2 pages.

(Continued)

*Primary Examiner*—Jean M. Corrielus
(74) *Attorney, Agent, or Firm*—Richard C. Auchterlonie; Novak Druce & Quigg, LLP

(57) ABSTRACT

A file server maintains a series of read-only snapshot copies of a production file system. A read-write snapshot copy is created based on a selected read-only snapshot copy by maintaining a set of save volume blocks of new data of the read-write snapshot copy. A block of new data is written to the read-write snapshot copy by allocating a save volume block and writing to the save volume block. A specified block is read from the read-write snapshot copy by checking whether there is a respective save volume block allocated to the specified block, and if so, reading from the respective save volume block, and if not, reading from the read-only snapshot copy upon which the read-write snapshot copy is based. The read-write snapshot copy can be refreshed with a specified read-only snapshot copy. The production file can be restored with a specified read-write snapshot copy.

32 Claims, 21 Drawing Sheets

U.S. PATENT DOCUMENTS

| | | | |
|---|---|---|---|
| 6,549,992 B1 | 4/2003 | Armangau et al. | 711/162 |
| 6,618,794 B1 | 9/2003 | Sicola et al. | 711/154 |
| 6,792,518 B1* | 9/2004 | Armangau et al. | 711/162 |
| 6,934,822 B1* | 8/2005 | Armangau et al. | 711/162 |
| 6,957,362 B1* | 10/2005 | Armangau | 714/20 |
| 2003/0079102 A1 | 4/2003 | Lubbers et al. | 711/202 |
| 2003/0158873 A1 | 8/2003 | Sawdon et al. | 707/204 |
| 2003/0182253 A1* | 9/2003 | Chen et al. | 707/1 |
| 2003/0217119 A1 | 11/2003 | Raman et al. | 709/219 |
| 2004/0030727 A1* | 2/2004 | Armangau et al. | 707/200 |
| 2004/0030846 A1* | 2/2004 | Armangau et al. | 711/154 |
| 2004/0030951 A1* | 2/2004 | Armangau | 714/6 |
| 2004/0107222 A1* | 6/2004 | Venkatesh et al. | 707/200 |
| 2004/0267836 A1* | 12/2004 | Armangau et al. | 707/203 |
| 2005/0015663 A1* | 1/2005 | Armangau et al. | 714/15 |
| 2005/0065985 A1* | 3/2005 | Tummala et al. | 707/201 |
| 2005/0193245 A1* | 9/2005 | Hayden et al. | 714/13 |
| 2005/0273570 A1* | 12/2005 | DeSouter et al. | 711/203 |

OTHER PUBLICATIONS

"Celerra File Server in the E-Infostructure," EMC Corporation, Hopkinton, Mass., 2000, 9 pages.

"Celerra File Server Architecture for High Availability," EMC Corporation, Hopkinton, Mass., Aug. 1999, 7 pages.

Chutani, Sailesh, et al., "The Episode File System," Carnegie Mellon University IT Center, Pittsburgh, PA, Jun. 1991, 18 pages.

D.L. Burkes and R.K. Treiber, "Design Approaches for Real-Time Transaction Processing Remote Site Recovery," Digest of Papers in Spring COMPCOM90, Feb. 26-Mar. 2, 1990, *Thirty-Fifth IEEE Computer Society International Conference*, San Francisco, CA, pp. 568-572.

"Network Data Management Protocol (NDMP)," http://www.ndmp.org/info/; NDMP White Paper, http://www.ndmp.org/info/technology/wp.html; "Protocol Specification Summary, Document Version: 1.7.2S," http://www.ndmp.org/info/spec_summary.html; "Legato Systems Embraces the NDMP Standard: Legato Networker Software to be NDMP Compliant in Q3," http://www.ftp.legata.com/News/Press/PR209.html; published at least as early as Oct. 11, 1999, 17 pages.

R. Stager and D. Hitz, Internet Draft filename "draft-stager-iquard-netapp-backup-05.txt," *Network Data Management Protocol* (*NDMP* ), last update Oct. 12, 1999, pp. 1-73.

Koop, P., "Replication at Work. (four companies use Oracle and Sybase replication servers to solve business problems)," DBMS, vol. 8, No. 3, p. 54(4), Mar. 1995.

"Remote Mirroring Technical White Paper", Copyright 1994-2002 Sun Microsystems, published at least as early as May 17, 2002 at sun.com, 25 pages.

"EMC TechNote:" Celerra Replicator, EMC Corporation, Hopkinton, MA, 2002 (5 pages).

"EMC TimeFinder Product Description Guide", EMC Corporation, Hopkinton, MA, 1998, pp. 1-31.

"Leveraging SnapView/IP in Oracle8i Environments with the CLARiiON IP4700 File Server", Engineering White Paper, EMC Corporation, Hopkinton, MA, Feb. 13, 2002, pp. 1-16.

"Using EMC CLARiiON FC4700 and SnapView with Oracle 8i", Engineering Whtie Paper, EMC Corporation, Hopkinton, MA, Mar. 4, 2002, pp. 1-22.

"Disaster Recovery Guidelines for using HP SureStore E XP256, Continuous Access XP with Oracle Databases," Rev 1.03, Hewlett-Packard Company, Palo Alto, CA, May 2000, pp. 1-28.

"Enterprise Volume Manager and Oracle8 Best Practices", Compaq White Paper, Compaq Compter Corporation, Dec. 1999, pp. 1-11.

VERITAS Database Edition for Oracle, "Guidelines for Using Storage Checkpoint and Storage Rollback with Oracle Databases", Veritas Software Corporation, Mountain View, CA, Aug. 2001, pp. 1-16.

"VERITAS Volume Replication and Oracle Databases", A Solutions White Paper, Veritas Software Corporation, Mountain View, CA, May 29, 2000, pp. 1-31.

Nabil Osorio and Bill Lee, "Guidelines for Using Snapshot Storage Systems for Oracle Databases", Oracle Corporation, Oct. 2001, pp. 1-12.

* cited by examiner

US 7,035,881 B2

ORGANIZATION OF READ-WRITE SNAPSHOT COPIES IN A DATA STORAGE SYSTEM

FIELD OF THE INVENTION

The present invention relates generally to computer data storage, and more particularly, to a snapshot copy facility for a data storage system.

BACKGROUND OF THE INVENTION

A snapshot copy of a production file system contains the state of the production file system at a respective point in time when the snapshot copy is created. A snapshot copy facility can create a snapshot copy without any substantial disruption to concurrent read-write access to the production file system. Such a snapshot copy facility, for example, is described in Keedem U.S. Pat. No. 6,076,148 issued Jun. 13, 2000, incorporated herein by reference. Snapshot copies have been used for a variety of data processing and storage management functions such as storage backup, transaction processing, and software debugging.

Users are becoming less tolerant of delays in accessing their data, and even less tolerant of corruption of their data. Therefore, there has been a continuing interest in improving data availability and the effectiveness of recovery procedures. For example, after recovery, the integrity of the recovered file system is checked, and if a defect is found, an attempt is made to correct it. In addition, it is often possible to recover some of the data that was written to the production file system since the creation of the latest read-only version, for example, by replay of a log from an application program.

SUMMARY OF THE INVENTION

In accordance with one aspect, the invention provides a method of operating a file server for creating and maintaining a read-write snapshot copy of a production file system. The method includes creating a read-only snapshot copy of the production file system, and creating a read-write snapshot copy of the production file system based on the read-only snapshot copy of the production file system. The method includes maintaining the read-write snapshot copy of the production file system by maintaining a set of save volume blocks of new data of the read-write snapshot copy of the production file system. The method includes writing to a first specified block of the read-write snapshot copy of the production file system by writing to a respective save volume block allocated to the first specified block of the read-write snapshot copy of the production file system. The method also includes reading from a second specified block of the read-write snapshot copy of the production file system by checking whether there is a respective save volume block allocated to the second specified block of the read-write snapshot copy of the production file system, and upon finding that there is a respective save volume block allocated to the second specified block of the read-write snapshot copy of the production file system, reading from the respective save volume block found to be allocated to the second specified block of the read-write snapshot copy of the production file system. The method further includes reading from a third specified block of the read-write snapshot copy of the production file system by checking whether there is a respective save volume block allocated to the third specified block of the read-write snapshot copy of the production file system, and upon finding that there is not a respective save volume block allocated to the third specified block of the read-write snapshot copy of the production file system, reading the third specified block of the read-write snapshot copy of the production file system by reading from the read-only snapshot copy of the production file system.

In accordance with another aspect, the invention provides a method of operating a file server for providing access to a production file system and a read-write snapshot copy of the production file system. The method includes the file server maintaining a clone volume of blocks in the production file system, a set of save volume blocks of old data from the production file system, and a set of save volume blocks of new data of the read-write snapshot copy file system. The method includes the file server writing new data to a first specified block in the production file system by copying old data from the first specified block in the clone volume to a save volume block and then writing to the first specified block in the clone volume. The method includes the file server reading a second specified block of the production file system by reading the second specified block from the clone volume. The method also includes the file server writing new data to a third specified block in the read-write snapshot copy of the production file system by writing to a save volume block. The method further includes the file server reading a fourth specified block from the read-write snapshot copy of the production file system by checking whether the fourth specified block is found in the set of save volume blocks of new data of the read-write snapshot copy of the production file system, and upon finding that the fourth specified block is found in the set of save volume blocks of new data of the read-write snapshot copy of the production file system, reading the fourth specified block from the set of save volume blocks of new data of the read-write snapshot copy of the production file system.

In accordance with another aspect, the invention provides a file server including means for storing a production file system, means for creating and maintaining a series of read-only snapshot copies of the production file system, and means for creating and maintaining read-write snapshot copies of the production file system. Each of the read-write snapshot copies of the production file system is based on a respective one of the read-only snapshot copies of the production file system.

In accordance with yet another aspect, the invention provides a file server for creating and maintaining a read-write snapshot copy of a production file system. The file server is programmed for creating a read-only snapshot copy of the production file system, creating a read-write snapshot copy of the production file system based on the read-only snapshot copy of the production file system, and maintaining the read-write snapshot copy of the production file system by maintaining a set of save volume blocks of new data of the read-write snapshot copy of the production file system. The file server is programmed for writing to a first specified block of the read-write snapshot copy of the production file system by writing to a respective save volume block allocated to the first specified block of the read-write snapshot copy of the production file system. The file server is programmed for reading from a second specified block of the read-write snapshot copy of the production file system by checking whether there is a respective save volume block allocated to the second specified block of the read-write snapshot copy of the production file system, and upon finding that there is a respective save volume block allocated to the second specified block of the read-write snapshot copy of the production file system, reading from the respective save volume block found to be allocated to the second specified block of the read-write snapshot copy of the production file system. The file server is further programmed for reading from a third specified block of the read-write snapshot copy of the production file system by checking whether there is a respective save volume block allocated to the third specified block of the read-write snapshot copy of the production file system, and upon finding that there is not a respective save volume block allocated to the third specified block of the read-write snapshot copy of the production file system, reading the third specified block of the read-write snapshot copy of the production file system by reading from the read-only snapshot copy of the production file system.

In accordance with a final aspect, the invention provides a file server for providing access to a production file system and a read-write snapshot copy of the production file system. The file server is programmed to maintain a clone volume of blocks in the production file system, a set of save volume blocks of old data from the production file system, and a set of save volume blocks of new data of the read-write snapshot copy file system. The file server is programmed to write new data to a first specified block in the production file system by copying old data from the first specified block in the clone volume to a save volume block and then writing to the first specified block in the clone volume. The file server is programmed to read a second specified block of the production file system by reading the second specified block from the clone volume. The file server is programmed to write new data to a third specified block in the read-write snapshot copy of the production file system by writing to a save volume block. The file server is programmed to read a fourth specified block from the read-write snapshot copy of the production file system by checking whether the fourth specified block is found in the set of save volume blocks of new data of the read-write snapshot copy of the production file system, and if so, reading the fourth specified block from the set of save volume blocks of new data of the read-write snapshot copy of the production file system, and if not, checking whether the fourth specified block is found in the set of save volume blocks of old data from the production file system, and if so, reading the fourth specified block from the set of save volume blocks of old data from the production file system, and if not, reading the fourth specified block from the clone volume.

BRIEF DESCRIPTION OF THE DRAWINGS

Additional features and advantages of the invention will be described below with reference to the drawings, in which.

Figure 1:
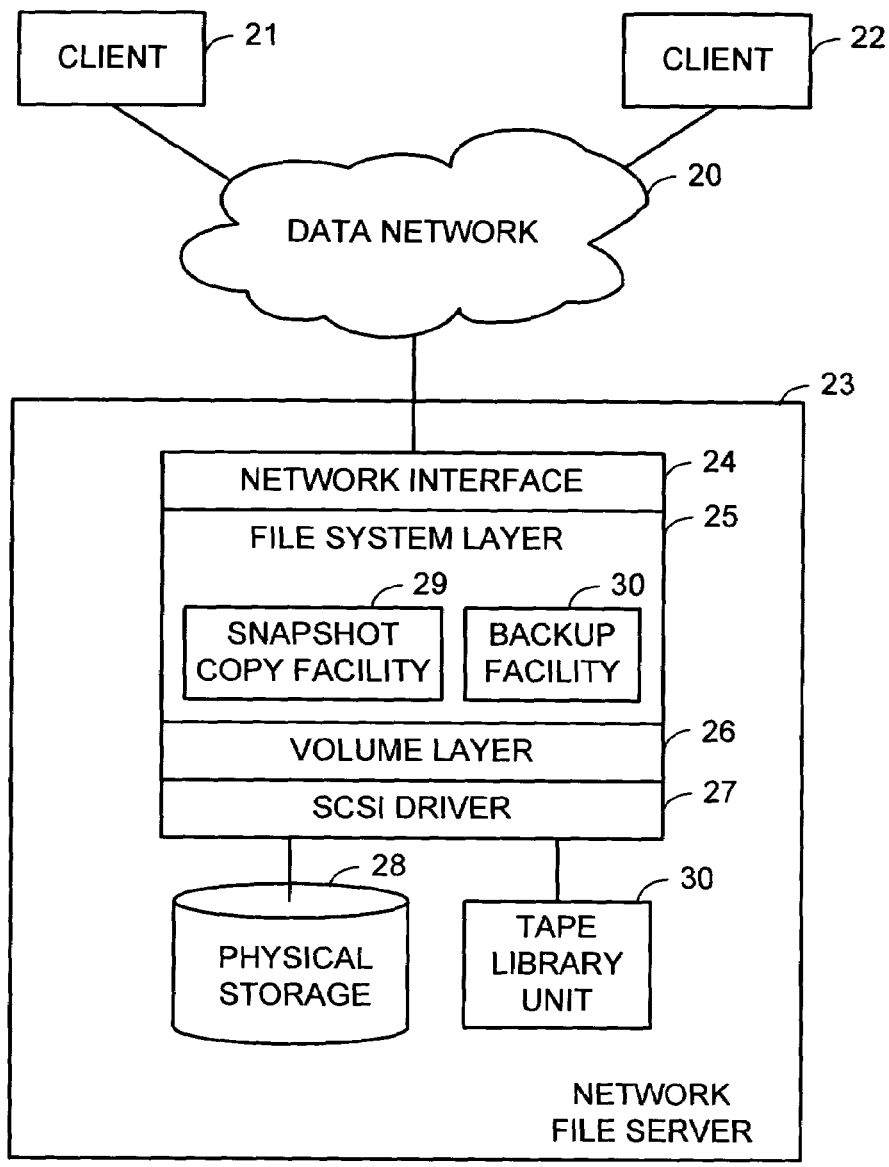
FIG. 1 is a block diagram of a data network including clients that share a network file server.

While the invention is susceptible to various modifications and alternative forms, specific embodiments thereof have been shown in the drawings and will be described in detail. It should be understood, however, that it is not intended to limit the invention to the particular forms shown, but on the contrary, the intention is to cover all modifications, equivalents, and alternatives falling within the scope of the invention as defined by the appended claims.

DETAILED DESCRIPTION OF THE PREFERRED EMBODIMENTS

With reference to FIG. 1, there is shown a data network 20 linking clients 21, 22 to a network file server 23. The network file server has a network interface 24 for coupling to the data network, a file system layer 25 for organizing data into a hierarchical structure of files and directories, a volume layer 26 for organizing the data into logical volumes of data blocks, a Small Computer System Interface (SCSI) driver 27, and physical storage 28 linked to the logical volume layer 26 through the SCSI driver 27.

Further details regarding the construction and operation of network file servers are found in Vahalia et al., U.S. Pat. No. 5,893,140, incorporated herein by reference, and Xu et al., U.S. Pat. No. 6,324,581, issued Nov. 27, 2001, incorporated herein by reference.

For recovery from a system crash, the network file server 23 includes a snapshot copy facility 29, a backup facility 30, and a tape library unit 30. To create a backup copy on a tape cassette (not show) in the tape library unit 30, the snapshot copy facility first creates a snapshot copy of the file system. Then the backup facility 30 transfers the snapshot copy to the tape cassette in the tape library unit 30.

Instead of using a single read-only snapshot for making a backup copy of a file, it is possible to keep a series of read-only snapshots in the network file server. In this case, when a crash occurs and the most recent snapshot is found to be corrupted, then an older snapshot is immediately available for use in restoring the read-write file. Moreover, once an entire copy of an initial snapshot has been migrated to the backup storage, only the changes between the snapshots need be written to the backup storage in order to fully recover all of the snapshots. In this case, there is a savings in backup processing time and in backup storage capacity because more than one backup copy of each file system block will neither be transmitted to the backup storage device nor stored in the backup storage.

I. A Prior-Art Multiple Snapshot Copy Facility for a Network File Server

Figure 2:
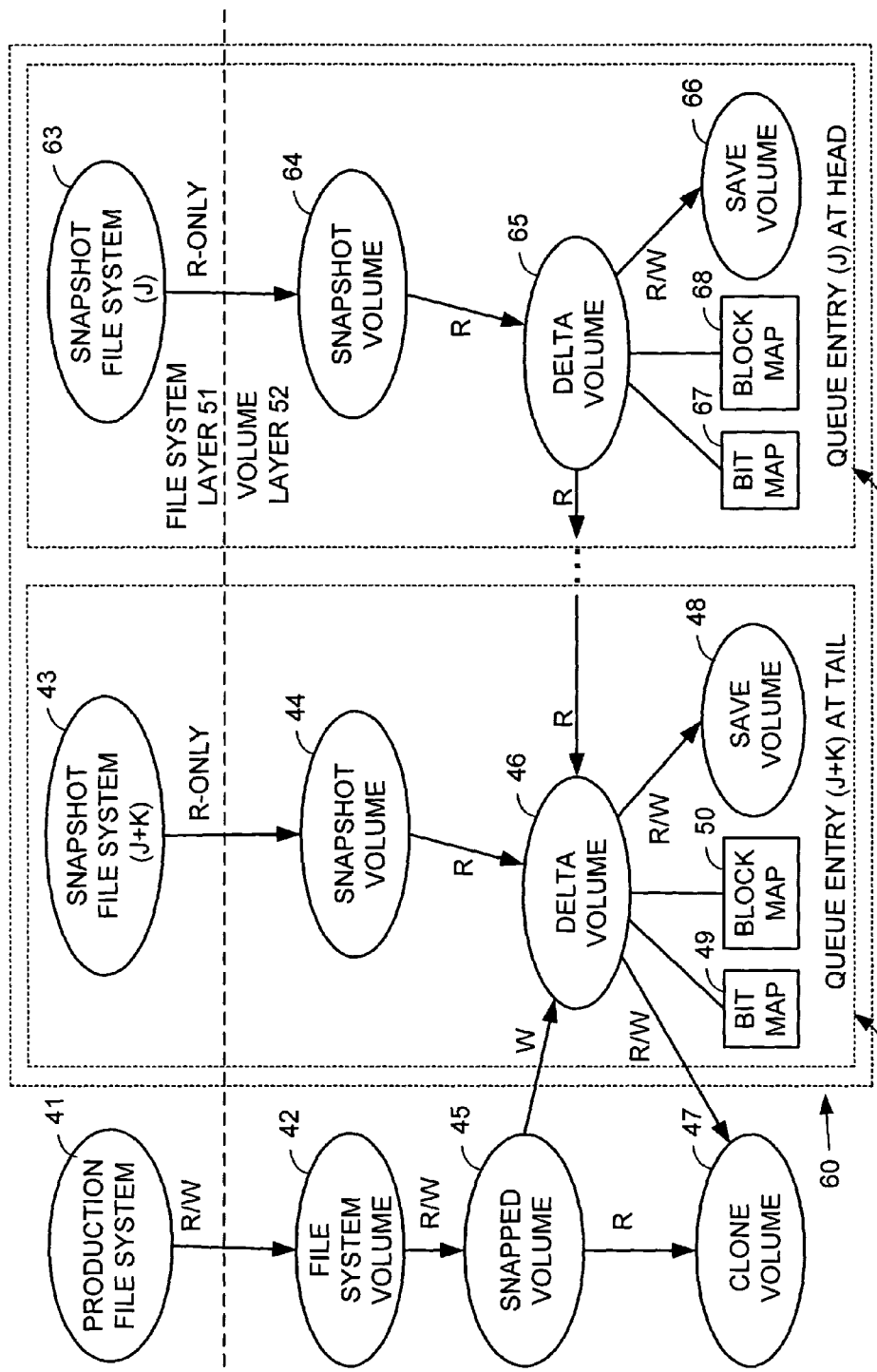
FIG. 2 shows a prior-art snapshot copy facility.

FIG. 2 shows a "prior art" snapshot copy facility, which provides multiple snapshots 43, 63 of a production file system 41. The content of each snapshot file system 43, 63 is the state of the production file system 41 at a particular point in time when the snapshot was created. The snapshot copy facility in FIG. 2 provides a hierarchy of objects in a volume layer 490 supporting the file systems in a file system layer 51. The production file system 41 is supported by read/write access to a file system volume 42. Each snapshot file system 43, 63 provides read-only access to a respective snapshot volume 44, 64.

Additional objects in the volume layer 490 of FIG. 2 permit the content of each snapshot file system to be maintained during concurrent read/write access to the production file system 41. The file system volume 42 is supported by a snapped volume 45 having read access to a clone volume 47 and write access to a delta volume 46. The delta volume 46 has read/write access to the clone volume 47 and read/write access to a save volume 48.

The snapshot copy facility in FIG. 2 retains and identifies changes to the production file system 41 at a logical volume level of data storage. For example, the present state of the production file system is stored in the clone volume 47 and old versions of the logical blocks that have been changed in the clone volume are saved in a save volume 48. In order to conserve storage, the logical blocks of the save volume are dynamically allocated to the old versions of the changed blocks as the changes are made to the clone volume.

Figure 3:
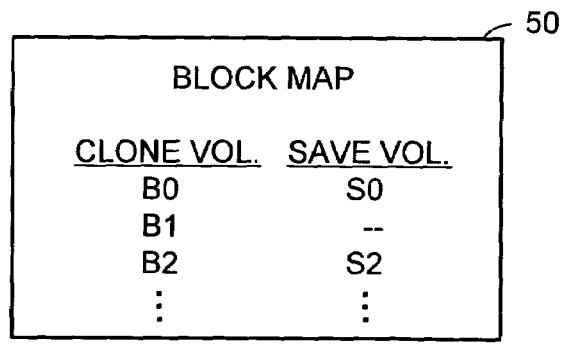
FIG. 3 shows a block map introduced in the snapshot copy facility of FIG. 2.

As shown in FIG. 3, for each logical block that has been changed in the clone volume 47, a block map 50 identifies the logical block address ($S_i$) of the old version of the block in the save volume 48 and the corresponding logical block address ($B_i$) of the changed block in the clone volume.

In the organization of FIG. 2, the actual data is stored in blocks in the clone volume 47 and a respective save volume 48, 66 in storage for each snapshot. The delta volume 46 also accesses information stored in a bit map 49 and the block map 50. The bit map 49 indicates which blocks in the clone volume 47 have prior versions in the save volume 48. In other words, for read-only access to the snapshot file system, the bit map 49 indicates whether the delta volume should read each block from the clone volume 47 or from the save volume 48. For example, the bit map is stored in memory and it includes a bit for each block in the clone volume 47.

The bit is clear to indicate that there is no prior version of the block in the save volume 48, and the bit is set to indicate that there is a prior version of the block in the save volume 48.

Consider, for example, a production file system 41 having blocks a, b, c, d, e, f, g, and h. Suppose that when the snapshot file system 43 is created, the blocks have values a0, b0, c0, d0, e0, f0, g0, and h0. Thereafter, read/write access to the production file system 41 modifies the contents of blocks a and b, by writing new values a1 and a2 into them. At this point, the following contents are seen in the clone volume 47 and in the save volume 48:

Clone Volume: a1, b1, c0, d0, e0, f0, g0, h0
Save Volume: a0, b0

From the contents of the clone volume 47 and the save volume 48, it is possible to construct the contents of the snapshot file system 43. When reading a block from the snapshot file system 43, the block is read from the save volume 48 if found there, else it is read from the clone volume 47.

FIG. 2 further shows that a snapshot queue 60 maintains respective objects supporting multiple snapshot file systems 43, 63 created at different respective points in time from the production file system 41. In particular, the snapshot queue 60 includes a queue entry (J+K) at the tail 61 of the queue, and a queue entry (J) at the head 62 of the queue. In this example, the snapshot file system 43, the snapshot volume 44, the delta volume 46, the save volume 48, the bit map 49, and the block map 50 are all located in the queue entry at the tail 61 of the queue. The queue entry at the head of the queue 62 includes similar objects; namely, the snapshot file system (J) 63, a snapshot volume 64, a delta volume 65, a save volume 66, a bit map 67, and a block map 68.

The snapshot copy facility in FIG. 2 may respond to a request for another snapshot of the production file system 41 by allocating the objects for a new queue entry, and inserting the new queue entry at the tail of the queue, and linking it to the snapped volume 45 and the clone volume 47. In this fashion, the save volumes 48, 66 in the snapshot queue 60 are maintained in a chronological order of the respective points in time when the snapshot file systems were created. The save volume 66 supporting the oldest snapshot file system 63 resides at the head 62 of the queue, and the save volume 48 supporting the youngest snapshot file system 43 resides at the tail 61 of the queue.

Figure 4:
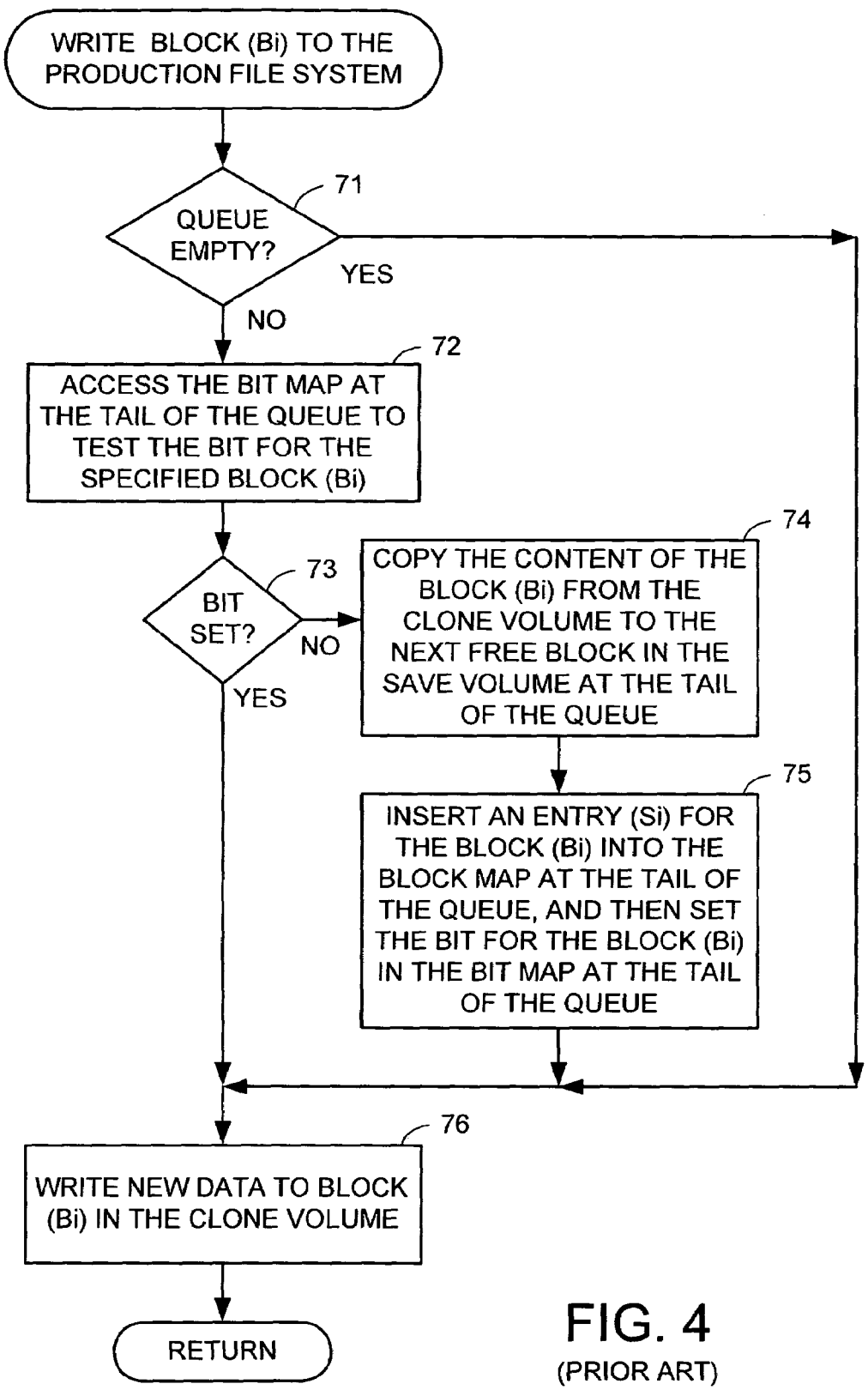
FIG. 4 is a flowchart of a procedure for writing a block of data to a production file system in the snapshot copy facility of FIG. 2.

FIG. 4 shows a procedure performed by the snapshot copy facility of FIG. 2 for writing a specified block ($B_i$) to the production file system. In a first step 71, if the snapshot queue is not empty, execution continues to step 72. In step 72, the bit map at the tail of the snapshot queue is accessed in order to test the bit for the specified block ($B_i$). Then in step 73, if the bit is not set, execution branches to step 74. In step 74, the content of the specified block ($B_i$) is copied from the clone volume to the next free block in the save volume at the tail of the snapshot queue. Execution continues from step 74 to step 75. In step 75, the save volume block address ($S_i$) of the free block is inserted into the entry for the block ($B_i$) in the block map at the tail of the queue, and then the bit for the block ($B_i$) is set in the bit map at the tail of the queue. After step 75, execution continues to step 76. Execution also continues to step 76 from step 73 if the tested bit is found to be set. Moreover, execution continues to step 76 from step 71 if the snapshot queue is empty. In step 76, new data is written to the specified block ($B_i$) in the clone volume, and then execution returns.

Figure 5:
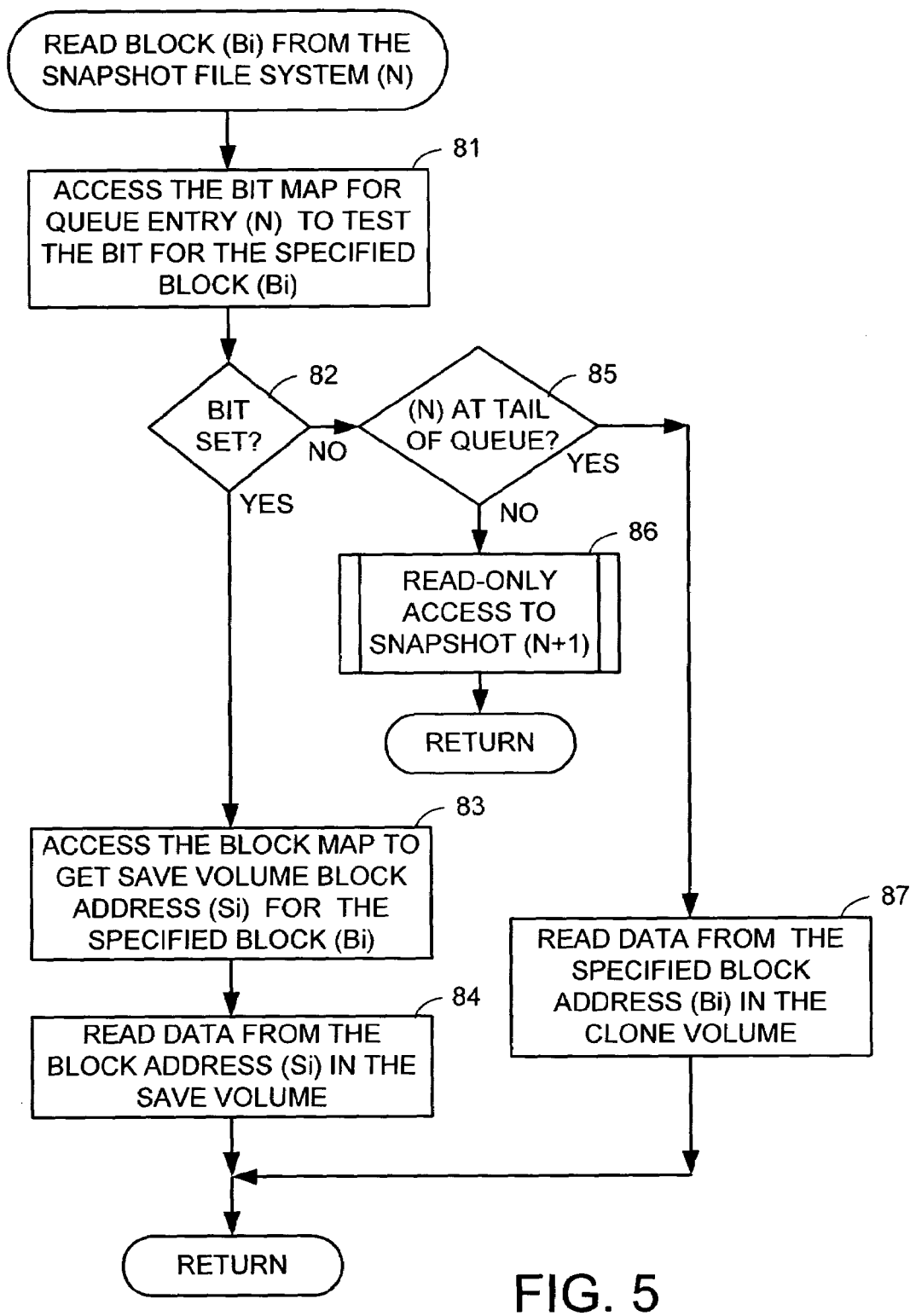
FIG. 5 is a flowchart of a procedure for reading a block of data from a snapshot file system in the snapshot copy facility of FIG. 2.

FIG. 5 shows a procedure performed by the snapshot copy facility for reading a specified block ($B_i$) from a specified snapshot file system (N). In a first step 81, the bit map is accessed for the queue entry (N) to test the bit for the specified block ($B_i$). Then in step 82, if the tested bit is set, execution continues to step 83. In step 83, the block map is accessed to get the save volume block address ($S_i$) for the specified block ($B_i$). Then in step 84 the data is read from the block address ($S_i$) in the save volume, and then execution returns.

If in step 82 the tested bit is not set, then execution branches to step 85. In step 85, if the specified snapshot (N) is not at the tail of the snapshot queue, then execution continues to step 86 to perform a recursive subroutine call upon the subroutine in FIG. 5 for read-only access to the snapshot (N+1). After step 86, execution returns.

If in step 85 the snapshot (N) is at the tail of the snapshot queue, then execution branches to step 87. In step 87, the data is read from the specified block ($B_i$) in the clone volume, and execution returns.

II. Maintenance of Meta Bit Maps in the Snapshot Copy Facility

In the above description of the snapshot copy process, and in particular with respect to FIG. 2, it was assumed that the original contents of a block of the production file system must be saved to the most recent save volume before the contents of the block are modified by a write access to the production file system. In practice, however, the original contents are often invalid, and therefore need not be saved. For example, many applications start with an empty file, and the file increases in size as data is written to the file. In some of these applications, the file rarely decreases in size. However, storage for the file may be released when the file is deleted from the file server, for example, when the file is transferred to archival storage. In some applications, the extent of a file may be dynamically decreased concurrent with read/write access to the file.

There are significant advantages to identifying when read/write access to the production file system is about to modify the contents of an invalid data block. If this can be done in an efficient manner, then there can be a decrease in the access time for write access to the production file system. A write operation to an invalid block can be executed immediately, without the delay of saving the original contents of the data block to the most recent save volume at the tail of the snapshot queue. Moreover, there is a saving of storage because less storage is used for the save volumes. There is also a decrease in memory requirements and an increase in performance for the operations upon the snapshot file systems, because smaller bit and block hash indices can be used, and the reduced amount of storage for the snapshots can be more rapidly restored to the production file system, or deallocated for re-use when snapshots are deleted.

An efficient way of identifying when read/write access to the production file system is about to modify the contents of an invalid data block is to use a meta bit map having a bit for indicating whether or not each allocated block of storage in the production file system is valid or not. For example, whenever storage is allocated to the production file system by the initial allocation or the extension of a clone volume, a corresponding meta bit map is allocated or extended, and the bits in the meta bit map corresponding to the newly allocated storage are initially reset.

Figure 6:
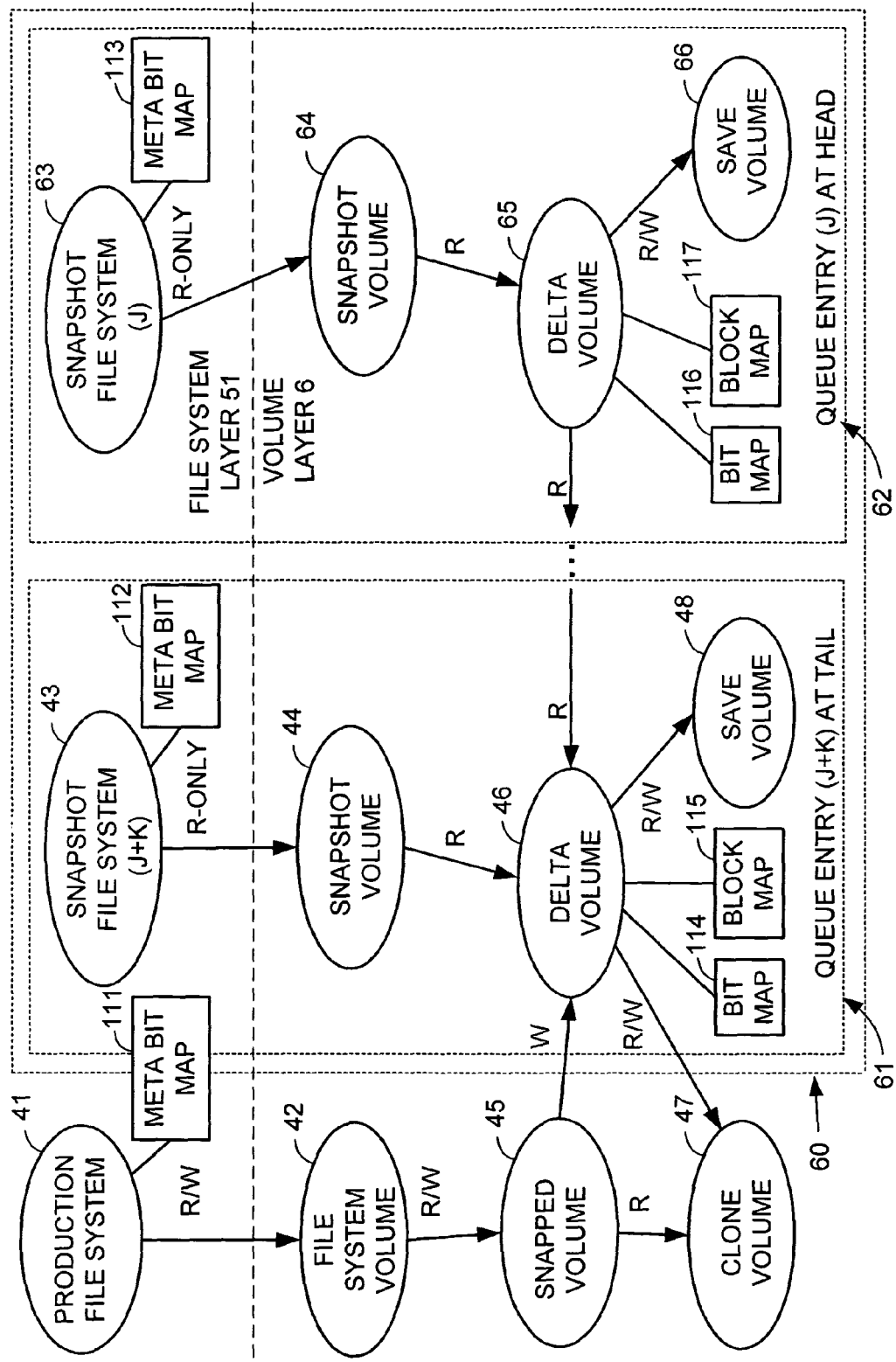
FIG. 6 is a block diagram of a snapshot copy facility using a meta bit map for keeping track of blocks of a production file system that are not in use in the snapshot copies of the production file system.

FIG. 6 shows an organization of the snapshots in the network file server when a respective meta bit map 112, 113 is maintained for each snapshot in addition to the meta bit map 111 for the production volume. It is desired to maintain a respective meta bit map for each snapshot so that whenever the production file system is restored with a snapshot file system, the meta bit map for the production file system can be restored with the meta bit map for each snapshot. For example, a meta bit map of the production file system is included in the production file system, so that whenever a snapshot copy of the production file system is created, a snapshot copy of the meta bit map is also created. Consequently, when the production file system is restored with a snapshot, the meta bit map of the production volume is replaced with the meta bit map of the snapshot.

As shown in FIG. 6, a meta bit map 111 is linked to the production file system 41 for indicating invalid blocks in the production file system. Each entry in the snapshot queue 60 includes a respective meta bit map linked to the snapshot file system in the entry. For example, the queue entry (J+K) at the tail 61 of the queue has a meta bit map 112 linked to the snapshot file system 43, and the queue entry (J) at the head 62 of the queue includes a meta bit map 113 linked to the snapshot file system 63.

To reduce the memory and storage requirements for maintaining the bit maps 114, 116 and block maps 115, 117, the each bit map is organized as a set of pages indexed by a page table, and the each block map is organized as a set of hash lists indexed by a hash table. The bit maps and block maps 114, 115 at the queue entry (J+K) at the tail of the queue are initially created in a random access memory cache and written back to storage of the save volume 48 when a next snapshot of the production file system 41 is created. Thereafter the bit maps and block maps can be deallocated from the random access memory in order to free up cache memory, and later staged from storage to the cache memory when needed for read access to their respective snapshots.

Figure 7:
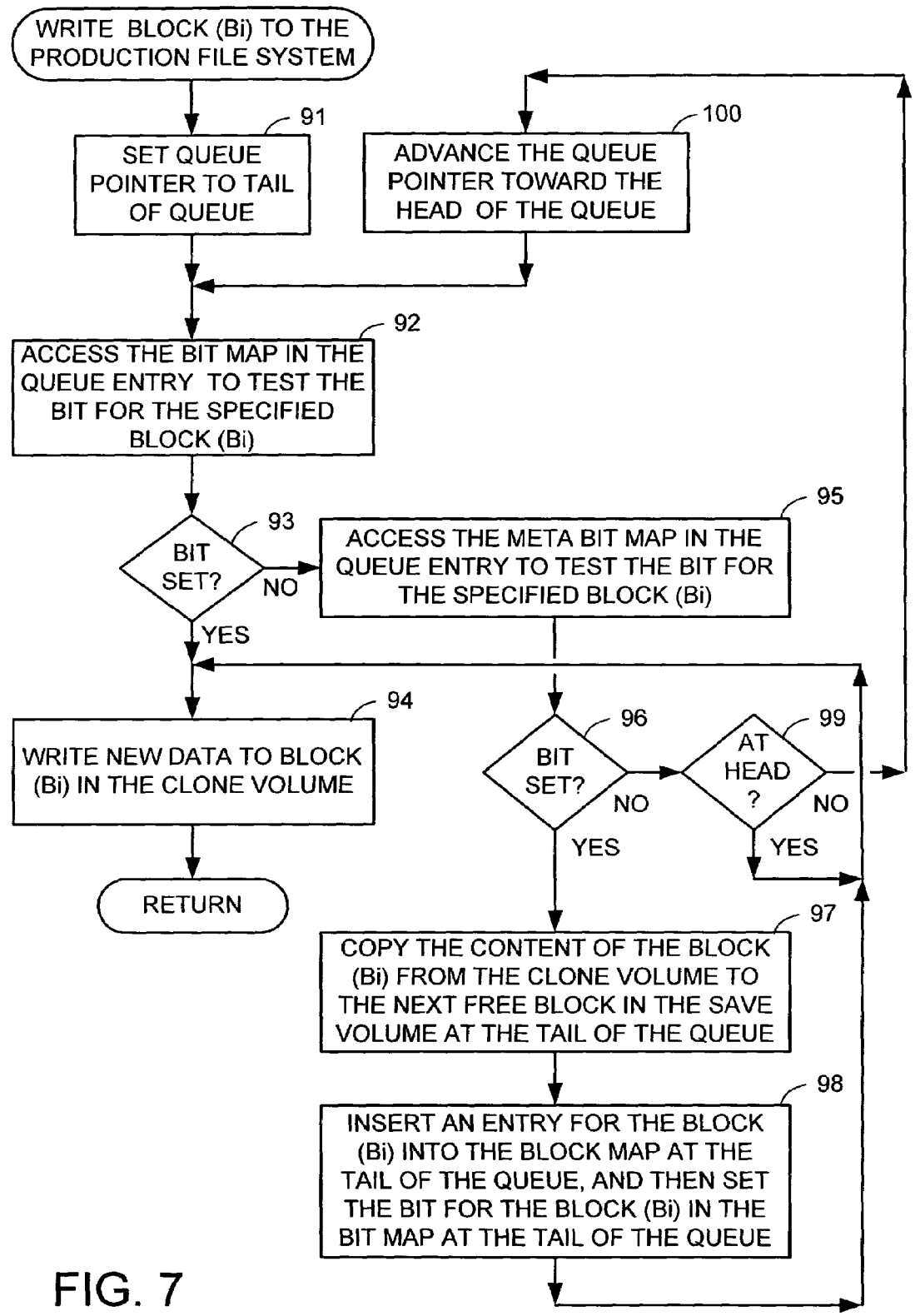
FIG. 7 is a flowchart for writing a specified data block to the production file system for a snapshot copy facility that uses a meta bit map for indicating the blocks in a production file system that are not presently in use.

FIG. 7 shows a procedure for writing a specified block (Bi) to the production file system when there is a meta bit map for indicating invalid data blocks in the production file system. In a first step 91, a queue pointer is set to point to the queue entry at the tail of the snapshot queue. Next, in step 92, the bit map in this snapshot queue entry is accessed to test the bit for the specified block (Bi). Next, in step 93, if the tested bit is found to be set, then execution continues to step 94. In step 94, new data is written to the specified block (Bi) in the clone volume, and then execution returns.

In step 93, if the bit in the bit map is not set, then execution branches to step 95. In step 95, the meta bit map in the snapshot queue entry is accessed to test the bit for the specified block (Bi). Then, in step 96, execution continues to step 97 if this bit is found to be set. In step 97, the content of the block (Bi) is copied from the clone volume to the next free block in the save volume at the tail of the snapshot queue. In step 98, an entry for the block (Bi) is inserted into the block map at the tail of the snapshot queue, and then the bit for the block (Bi) is set in the bit map at the tail of the snapshot queue. Execution continues from step 98 to step 94, to write new data to the block (Bi) in the clone volume.

In step 96, if the tested bit is found not to be set, then execution branches to step 99. If the queue pointer is pointing to the head of the queue, then execution branches to step 94, to write new data to the block (Bi) in the clone volume. Otherwise, if the queue pointer is not pointing to the head of the snapshot queue, then execution continues to step 100 to advance the queue pointer to the next snapshot queue entry toward the head of the snapshot queue. After step 100, execution loops back to step 92.

Figure 8:
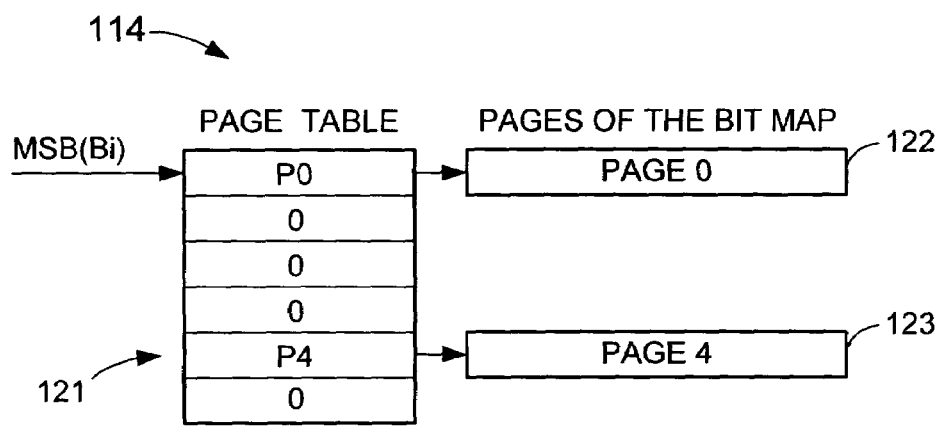
FIG. 8 shows a bit map including a page table and a set of pages, for use in the snapshot organization of FIG. 6.

FIG. 8 shows that the bit map 114 is organized as a page table 121 indexed by a set of most significant bits (MSB) of the block index (Bi), and pages 122 and 123 of the bit map linked to respective entries of the page table. The page table 121 includes a set of entries, each of which is either zero, indicating that the entire page is zero and therefore the page is not stored in storage or random access memory, or is a pointer to a page of the bit map.

Figure 9:
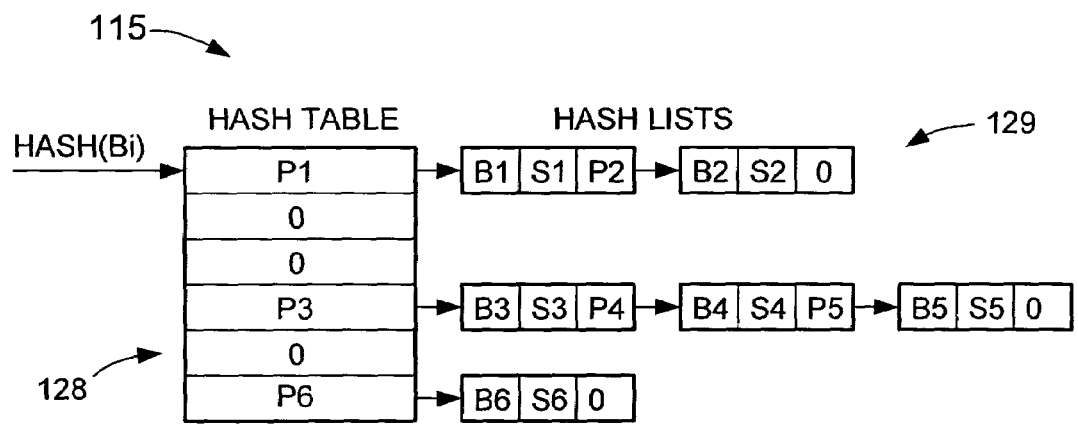
FIG. 9 shows a block map including a hash table and hash lists, for use in the snapshot organization of FIG. 6.

FIG. 9 shows that the block map 115 is organized as a hash table 128 indexed by a hashing of the block index (Bi), and a set of hash lists 129 linked to respective entries of the hash table 128. Each non-zero entry in the hash table 128 points to a respective one of the hash lists 129. Each entry in each hash list includes a block address ($B_i$) to a block in the clone volume, a corresponding block address ($S_i$) of the block in the save volume, and a value that is either zero indicating the end of the hash list, or a pointer to the next entry in the list.

It is not necessary to retain the bit map 114 for the snapshot because the block map 115 can be accessed to provide the same information that is contained in the bit map 114. In particular, the block map 115 can be accessed simply to determine whether or not a specified block (Bi) is found in the block map, and therefore can be found in the save volume for the corresponding snapshot. However, the bit map 114 can be accessed more quickly to provide this information. Therefore, for applications such as backup where the snapshots would be accessed very infrequently, it may be desirable to conserve storage by discarding the bit map for the snapshot at the tail of the queue once the next snapshot is created. Otherwise, for applications where the snapshots would be accessed frequently, the bit map for the snapshot at the tail of the snapshot queue may be written to storage and maintained in a random access cache memory as needed.

Figure 10:
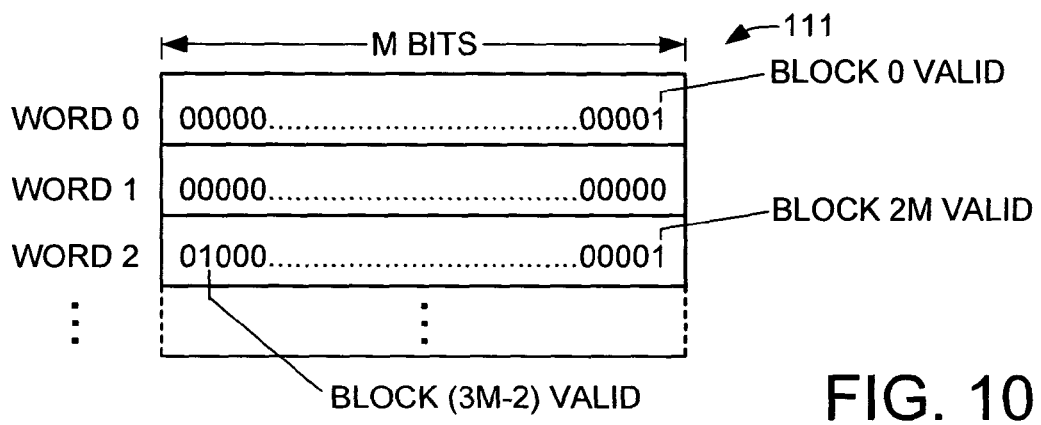
FIG. 10 shows a specific construction for and interpretation of a meta bit map for the production volume.

FIG. 10 shows that the meta bit map 111 has a respective bit corresponding to each block in the clone volume, and in this example, each bit in the meta bit map corresponds to one and only one block in the clone volume. The meta bit map 111 includes a series of words, each with a multiple of M bits. In this example, a bit having a value of zero indicates a corresponding block that is invalid, and a bit having a value of one indicates a corresponding block that is valid.

Figure 11:
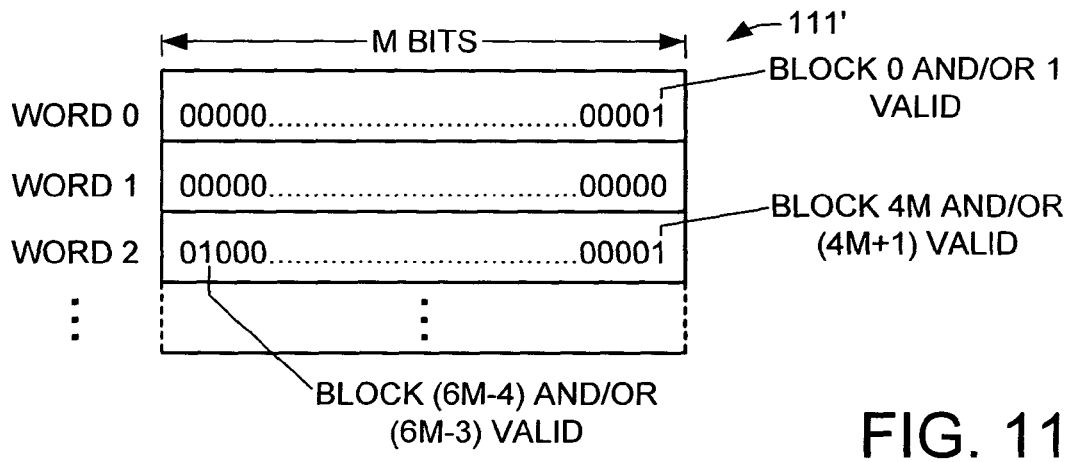
FIG. 11 shows an alternative interpretation of a meta bit map for the production volume.

The meta bit map, however, may have a granularity greater than one block per bit. For example, each bit in the meta bit map could indicate a range of block addresses, which may include at least some valid data. The benefit to the increased granularity is a reduced size of the meta bit map at the expense of sometimes saving invalid data to the save volume. For example, FIG. 11 shows the interpretation of a meta bit map 111' having a granularity of two blocks per bit. Each bit is set if any one of the two corresponding blocks is valid, or conversely, each bit is clear only if neither of the two corresponding blocks is valid. In this case, the block address can be converted to a bit address by an integer division by two, for example, by an arithmetic right shift of the block address by one bit position.

Further details and variations in the construction, operation, and use of a snapshot copy facility maintaining a series of read-only snapshot copies of a production file system are disclosed in Philippe Armangau et al., "Data Storage System Having Meta Bit Maps for Indicating Whether Data Blocks are Invalid in Snapshot Copies," U.S. patent application Ser. No. 10/213,241 filed Aug. 6, 2002, and issued as U.S. Pat. No. 6,792,518 on Sep. 14, 2004, incorporated herein by reference, and Philippe Armangau et al., Data Recovery With Internet Protocol Replication With or Without Full Resync, U.S. patent application Ser No. 10/603,951 filed Jun. 25, 2003, and published under publication No. 2005/0015663 on Jan. 20, 2005, incorporated herein by reference.

III. Organization of Read-Write Snapshot Copies in a Data Storage System

No mechanism has been described above for writing to the snapshot file systems 43, 63 in FIG. 6 after these snapshot file systems are created. Instead, when these snapshot file systems 43, 63 are accessed, they access data on a read-only basis from their corresponding snapshot volumes 44, 64 in the volume layer 52.

For some applications it is desirable to provide a non-disruptive and virtually instantaneous mechanism for making a read-write snapshot. For example, during the recovery process, it is often desirable to create a temporary read-write copy of a read-only snapshot prior to restoring the original read-write file after a system crash. Recovery can be attempted upon the temporary read-write file, and then application programs can be tested upon the temporary read-write copy. If a recovery program or an application program should crash when using the temporary read-write copy, then the temporary read-write copy can be deleted, and the recovery process can be restarted using another temporary read-write copy of another read-only snapshot.

Figure 12:
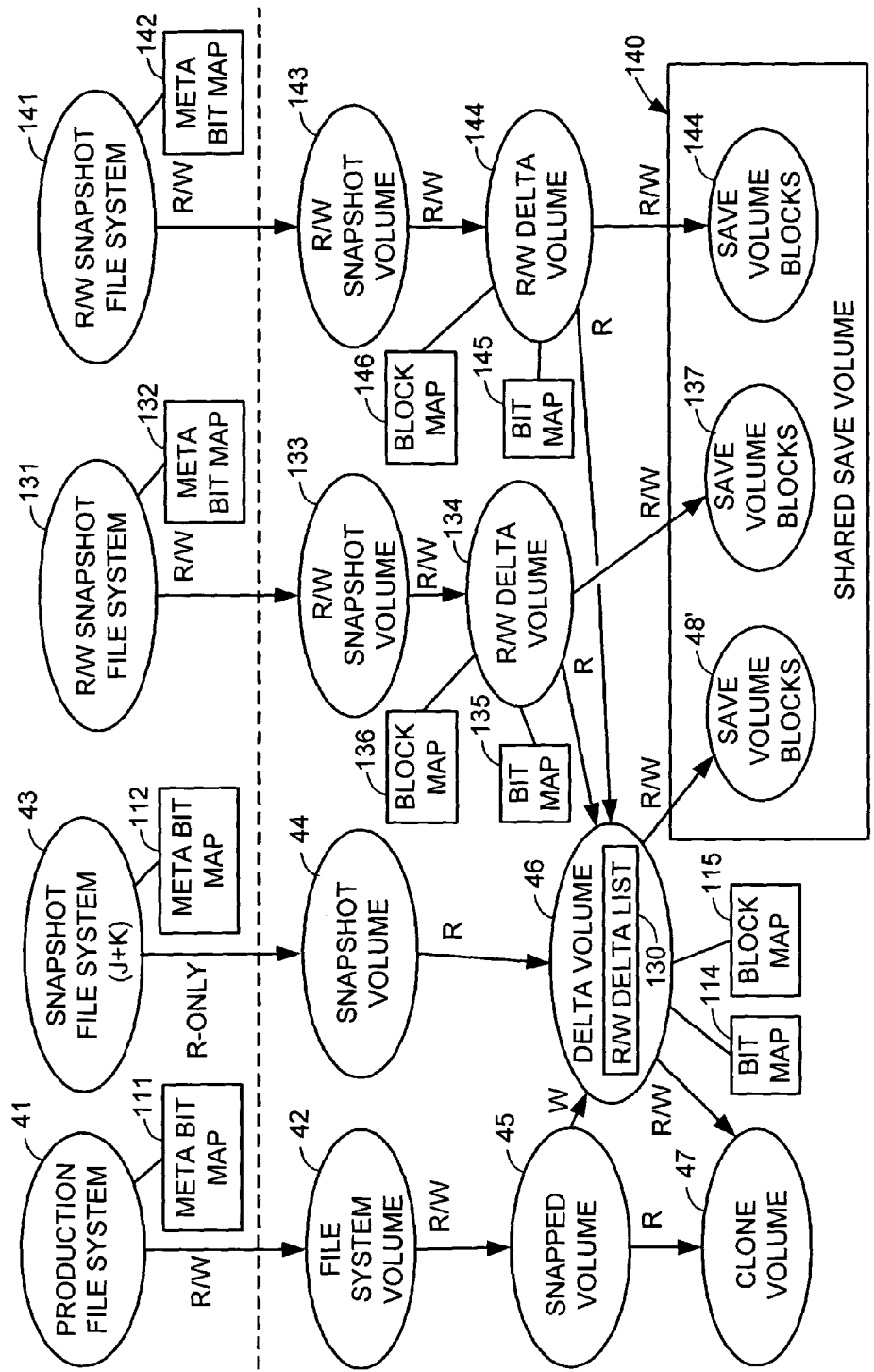
FIG. 12 shows a preferred organization of read-write snapshots in the snapshot copy facility of FIG. 6.

FIG. 12 shows a preferred organization of read-write snapshot file systems in the snapshot copy facility of FIG. 6. As a matter of convenience, each read-write snapshot file system is based upon a corresponding read-only snapshot file system in the snapshot queue. For example, FIG. 12 shows two read-write snapshot file systems 131 and 141 based upon a most recent read-only snapshot file system (J+K) at the tail of the snapshot queue. Each read-write snapshot file system can be mounted as read-write to do reads and writes.

In FIG. 12, each read-write snapshot file system is provided with a set of objects that is similar to the set of objects provided for each read-only snapshot file system. For example, the first read-write snapshot file system 131 is provided with a respective meta bit map 132, read-write snapshot volume 133, read-write delta volume 134, bit map 135, block map 136, and save volume blocks 137. The second read-write snapshot file system 141 also has a respective meta bit map 142, read-write snapshot volume 143, read-write delta volume 144, bit map 145, block map 146, and save volume blocks 147. In this example, a single save volume 140 contains save volume blocks 48' for the read-only snapshot file system (J+K) 43 and the respective save volume blocks 137 and 140 for the first and second read-write snapshot file systems 131, 141. In general, a single shared save volume may store the save volume blocks for multiple read-only snapshots and multiple read-write snapshots.

The meta bit map 132, 142 for each read-write snapshot file system indicates file system blocks that are not used in the read-write snapshot file system. The meta bit map 132, 142 is maintained for each read-write snapshot file system primarily so that it is available if the production file system would be restored with a read-write snapshot file system. For example, when the production file system is restored with a read-write snapshot file system, the meta bit map of the read-write file system becomes the meta bit map of the production file system.

In the example of FIG. 12, The read-write delta volume 134, 144 for each read-write snapshot file system 131, 141 is linked to the delta volume 46 of the read-only snapshot file system 43 upon which the read-write snapshot file system is based. Moreover, the delta volume 46 of each read-only snapshot 43 contains a "read-write delta list" of pointers to the read-write delta volumes 134, 144 of the read-write snapshot file systems that are based upon the read-only snapshot file system 43. In general, any number of read-write snapshots could be based on each read-only snapshot in the snapshot queue.

Figure 13:
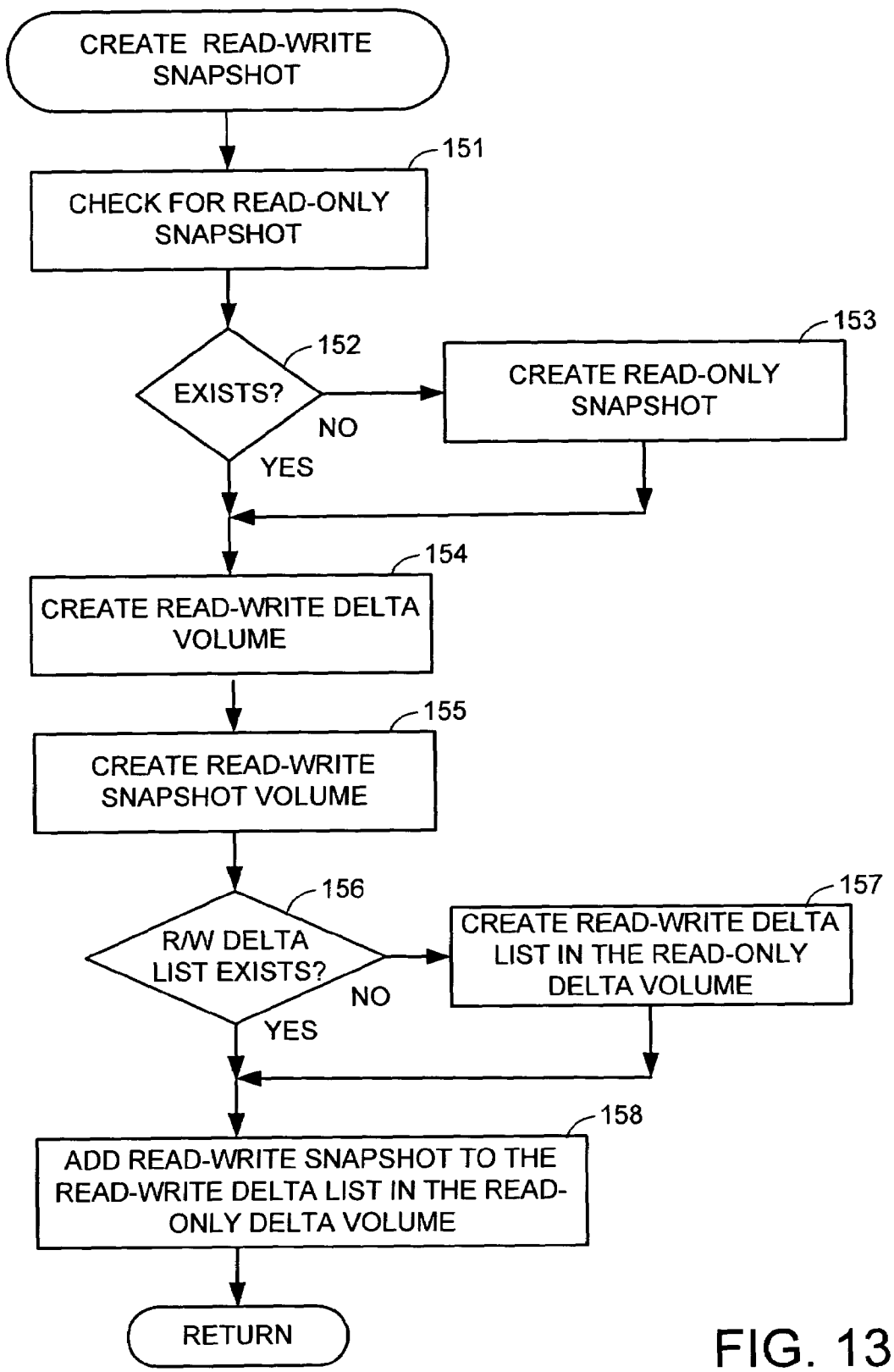
FIG. 13 shows a flowchart for creating a read-write snapshot of a production file system.

FIG. 13 shows a flowchart for creating a read-write snapshot of a production file system. The read-write snapshot is based on a specified read-only snapshot, or else a read-only snapshot is created and the read-write snapshot is based on the new read-only snapshot. In a first step 151, a search is made for a specification of a read-only snapshot, and if a specification does not exist, then execution branches from step 152 to step 153 to create a new read-only snapshot. In step 154, a read-write delta volume is created, as further shown in FIG. 14. The read-write delta volume includes a pointer to the read-only delta volume of the read-only snapshot upon which the read-write snapshot is based. In addition, the read-write delta volume for the read-write snapshot also has a bit map, a block map, and its own allocate thread to allocate blocks from the save volume in order to write data. Next, in step 155, a read-write snapshot volume is created for the read-write snapshot. The read-write snapshot pointer includes a pointer to the read-write delta volume of the read-write snapshot. In step 156, if a read-write delta list does not exist in the delta volume of the read-only snapshot upon which the read-write snapshot is based, then execution branches to step 157 to create the read-write delta list in the read-only delta volume. Once the read-write delta volume list is created, in step 158 a pointer to the read-write delta volume is added to the read-write delta volume list of the read-only delta volume of the read-only snapshot upon which the read-write snapshot is based. After step 158, execution returns.

Figure 14:
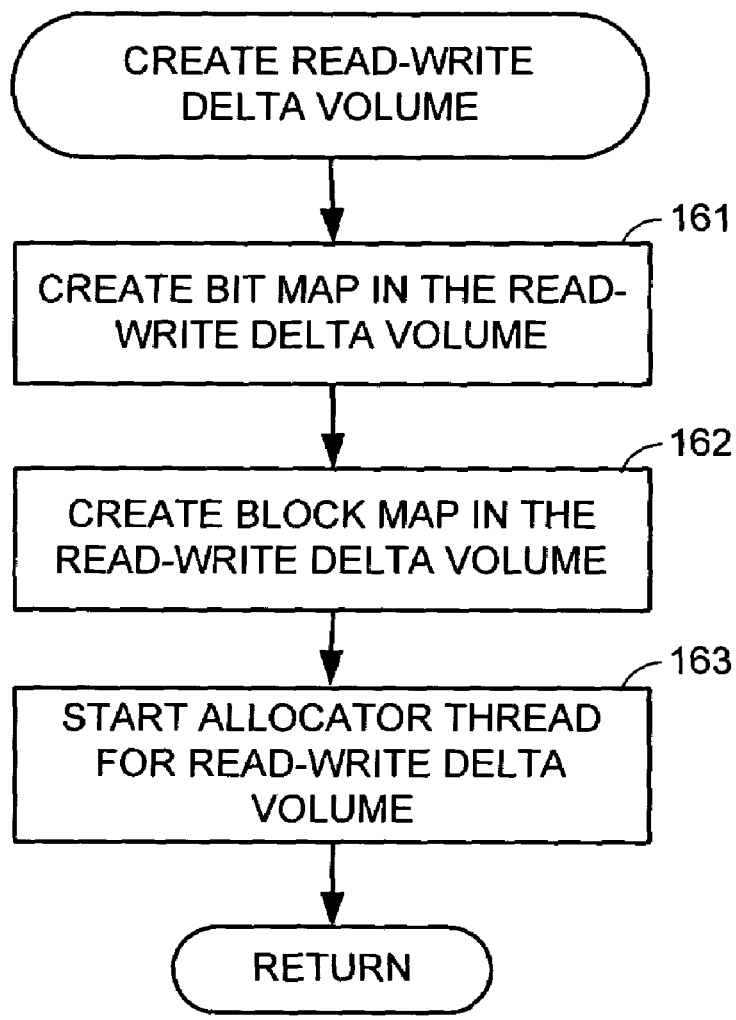
FIG. 14 shows a flowchart for creating a read-write delta volume.

FIG. 14 shows a flowchart for creating a read-write delta volume. In a first step 161, a bit map is created in the read-write delta volume. In step 162, a block map is created in the read-write delta volume. In step 163, an allocator thread is started for the read-write delta volume. After step 163, execution returns.

Figure 15:
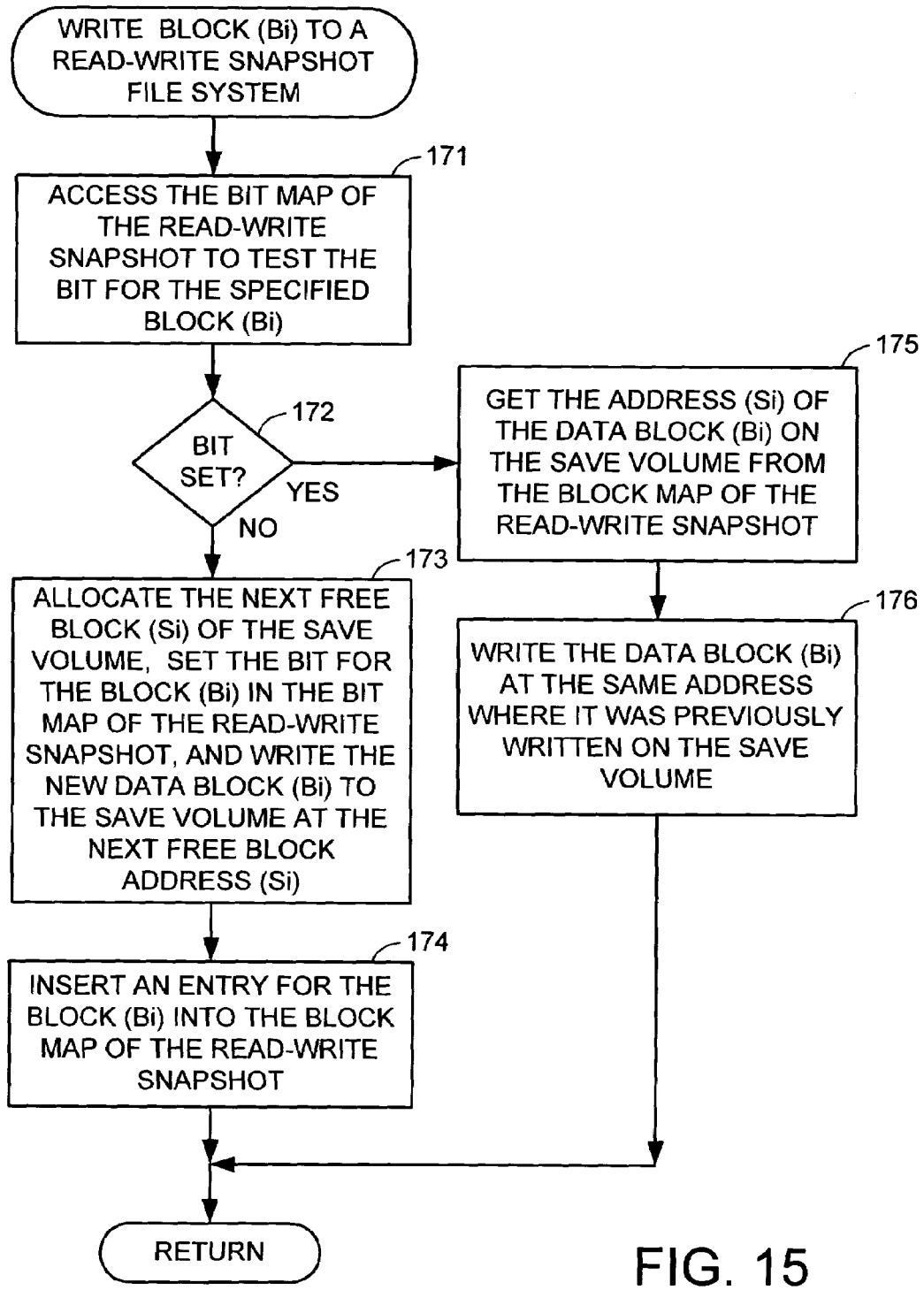
FIG. 15 shows a flowchart for writing a specified block to a read-write snapshot file system.

FIG. 15 shows a flowchart for writing a specified block (Bi) to a read-write snapshot file system. In a first step 171, the bit map of the read-write snapshot file system is accessed to test the bit corresponding to the specified block (Bi). If the bit corresponding to the specified block (Bi) is not set this means that the block has not been previously written. In this case, execution continues from step 172 to step 173. In step 173, a next free block address (Si) of the save volume is allocated using an allocate thread, the bit for the block (Bi) is set in the bit map of the read-write snapshot, and the new block (Bi) is written to the save volume at the allocated data block address. In step 174, the save volume address (Si) for the data block (Bi) is stored in the block map of the read-write snapshot, and execution returns.

In step 172, if the tested bit is set, this means that the block (Bi) was previously written to the save volume, and execution branches from step 172 to step 175. In step 175, the address (Si) on the save volume for this block (Bi) is obtained from the block map of the read-write delta volume. In step 176, once the save volume address is obtained, the new data for the block (Bi) is written to the save volume at the address (Si) where the block was previously written on the save volume. After step 176, execution returns.

Figure 16:
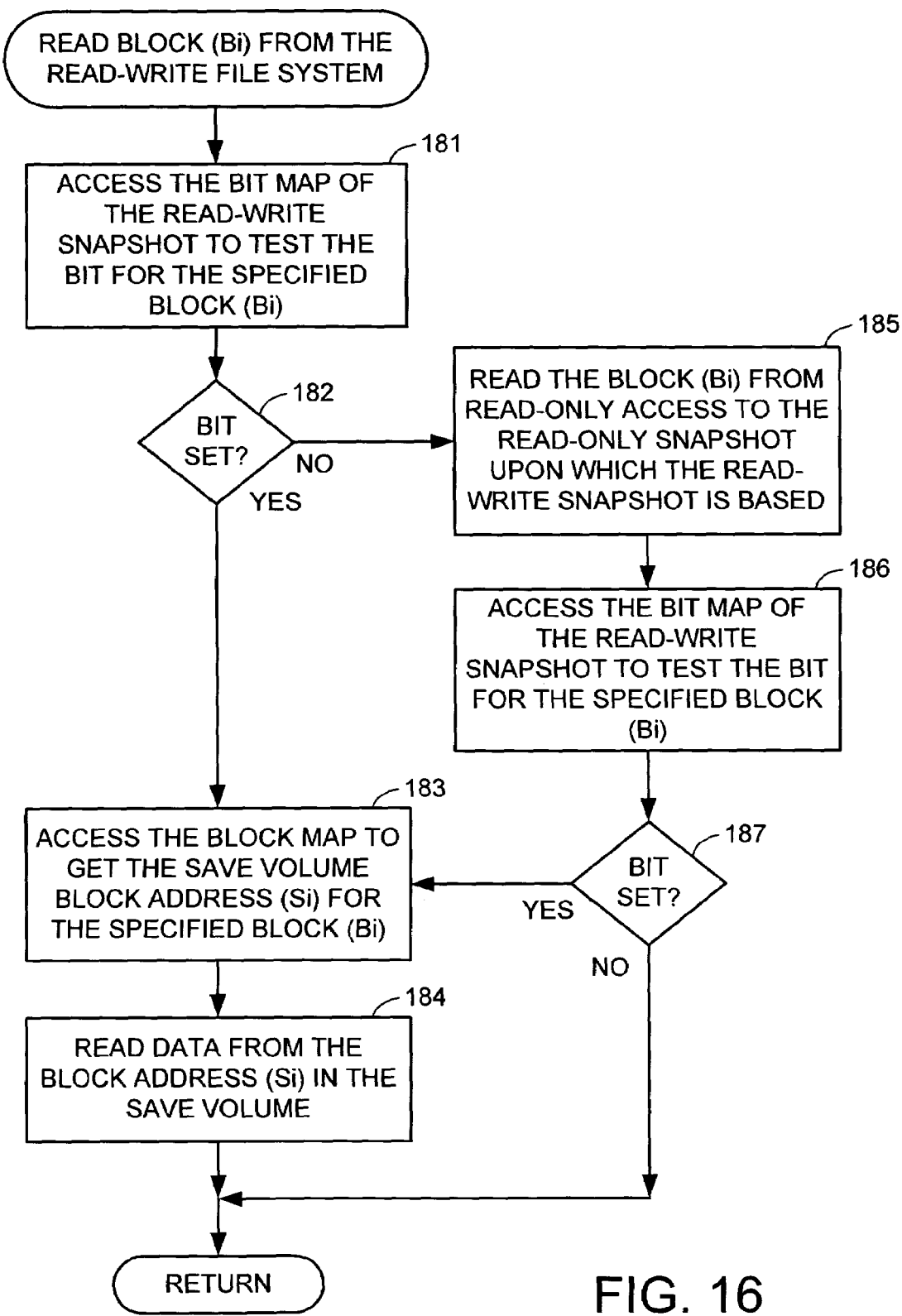
FIG. 16 shows a flowchart for reading a specified block of a read-write file system.

FIG. 16 shows a flowchart for reading a specified block (Bi) of a read-write file system. In a first step 181, the bit map of the read-write snapshot is accessed to test the bit corresponding to the specified block (Bi). In step 182, if the bit is set, this means that the block has been written with new data of the read-write file system. In this case, execution continues to step 183, and the save volume address (Si) where the block (Bi) is stored on the save volume is obtained from the block map of the read-write delta volume. Then in step 184, a read is performed on the save volume for the save volume address (Si), and execution returns.

In step 182, if the bit is not set this means that the block has not been written with new data of the read-write file system. In this case execution branches from step 182 to step 185 to read the block (Bi) by read-only access to the read-only snapshot upon which the read-write snapshot is based. This is done by issuing a read of the block (Bi) on the read-only delta volume of the read-only snapshot. After step 185, execution continues to step 186 to again access the bit map of the read-write snapshot to test whether the bit for the specified block (Bi) is set. This is done in case a concurrent write has occurred to the specified block (Bi) during step 185, in order for the read operation to obtain the most recent data written for the specified block. If the bit for the specified block (Bi) is now set, execution branches from step 187 to step 183 in order to read the most recent data by accessing the block map to get the save volume block address (Si) for the specified block. Otherwise, if the bit for the specified block (Bi) is not set, execution returns from step 187.

Figure 17:
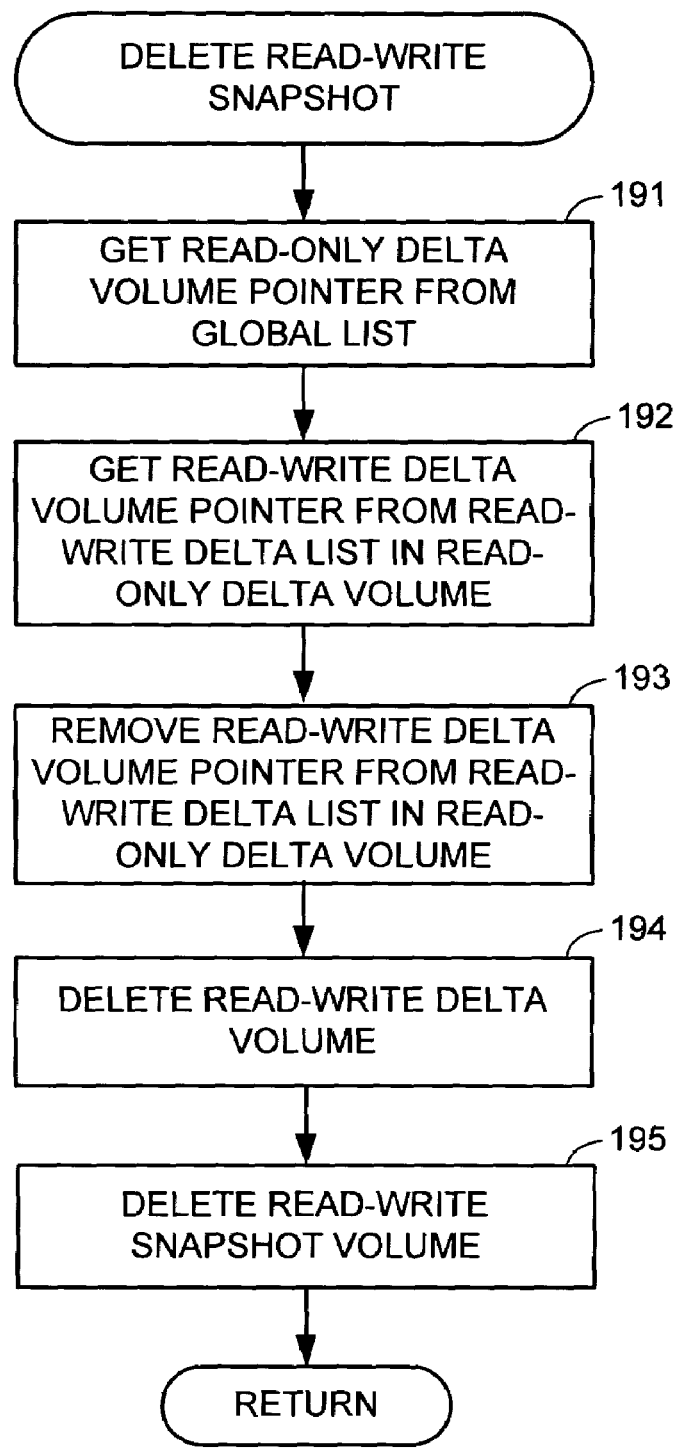
FIG. 17 shows a flowchart for deleting a read-write snapshot.

FIG. 17 shows a flowchart for deleting a read-write snapshot. In a first step 191, a global list is accessed to obtain a pointer to the read-only delta volume of the read-only snapshot upon which the read-write snapshot is based. Then in step 192, the read-write delta volume pointer to the read-write delta volume of the read-write snapshot to be deleted is obtained from the read-write delta list in the read-only delta volume. Once the pointer for the read-write delta volume is obtained, in step 193 it is removed from the read-write delta list of the read-only delta volume. In step 194 the read-write delta volume is deleted, as further shown in FIG. 18, and in step 195 the read-write snapshot volume is deleted. After step 195, execution returns.

Figure 18:
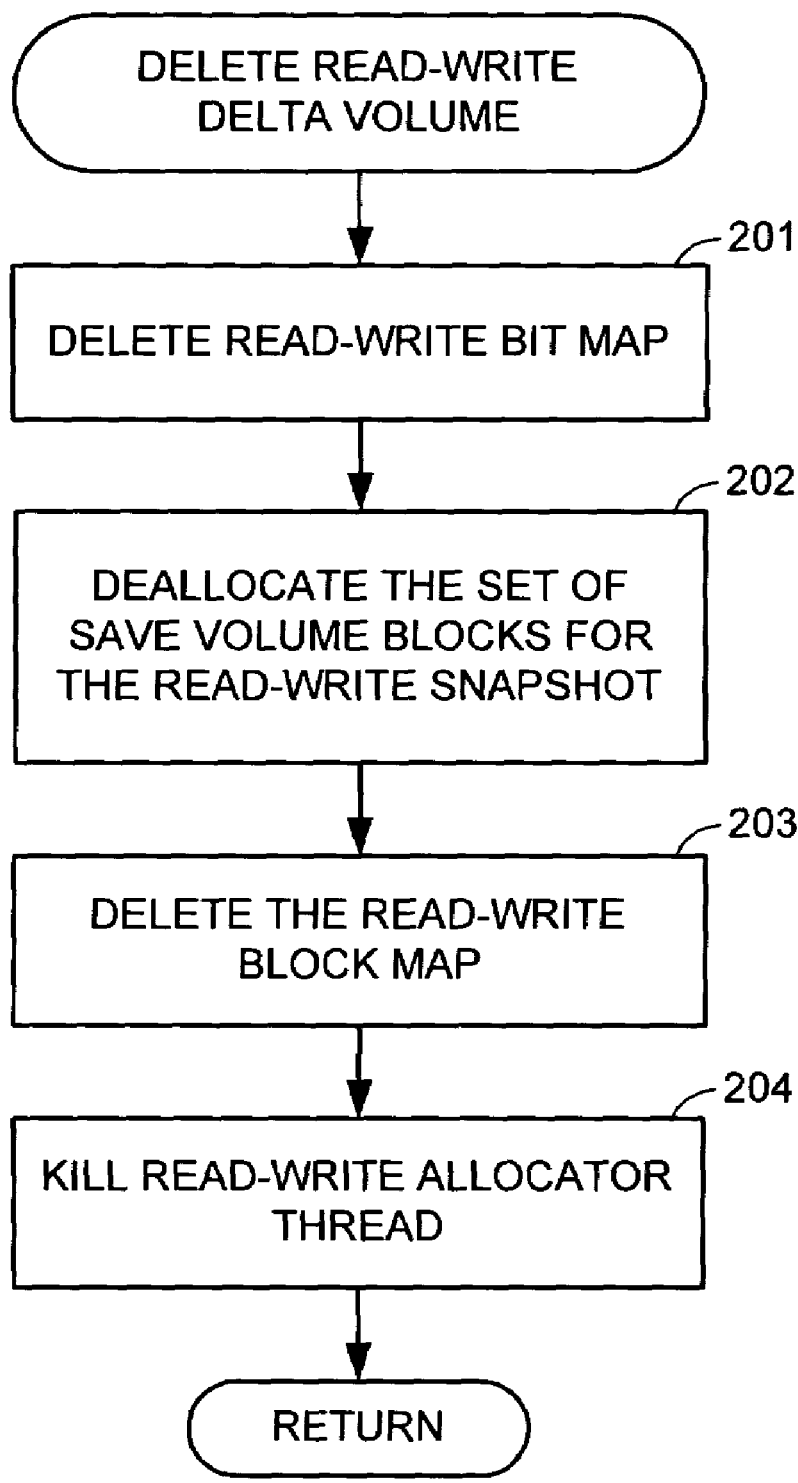
FIG. 18 shows a flowchart for deleting a read-write delta volume.

FIG. 18 shows a flowchart for deleting a read-write delta volume. In step 201, the read-write bit map of the read-write snapshot is deleted. In sep 202, the set of save volume blocks for the read-write snapshot (as indicated by the read-write block map of the read-write snapshot) are deallocated. In step 203, the read-write block map of the read-write snapshot is deleted. In step 204, the read-write allocator thread for the read-write delta volume is killed. After step 204, execution returns.

Figure 19:
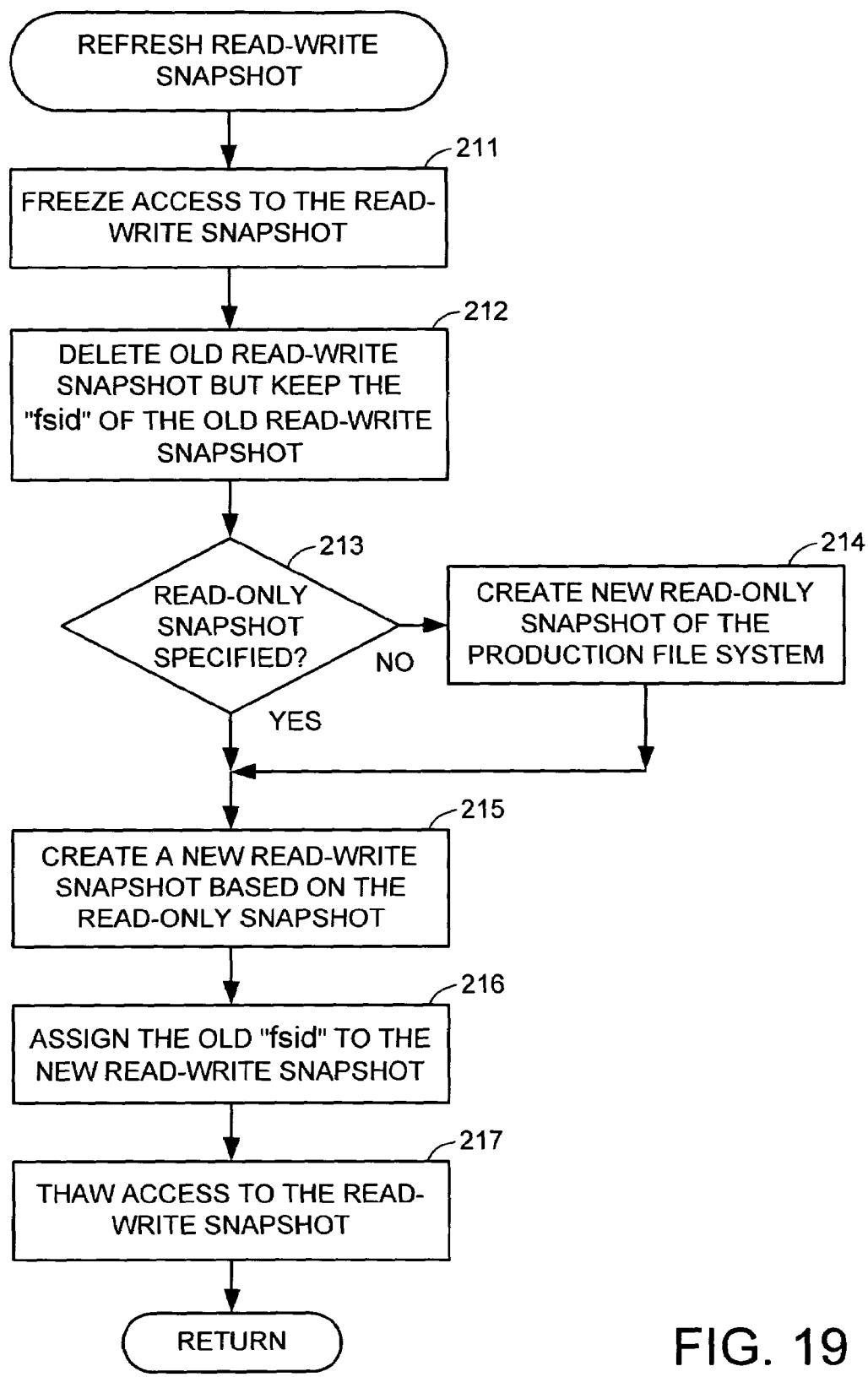
FIG. 19 shows a flowchart for refreshing a read-write snapshot.

FIG. 19 shows a flowchart of a routine for refreshing a read write snapshot with a specified read-only snapshot or with the present state of the production file system. The refresh involves replacing the original read-write snapshot with a new read-write snapshot and assigning the file system identifier (fsid) of the original read-write snapshot to the new read-write snapshot. In a first step 211, access to the read-write snapshot is frozen. Then in step 212, the original read-write snapshot is deleted, but the "fsid" of the original read-write snapshot is kept. In step 213, if a read-only snapshot is not specified for the restoration process, then execution branches to step 214 to create a new read-only snapshot of the production file system. In step 215, a new read-write snapshot is created based on the specified read-only snapshot or the new read-only snapshot. In step 216, the old file system identifier (fsid) is assigned to the new read-write snapshot. Finally, in step 217, access to the read-write snapshot is thawed, and execution returns.

Figure 20:
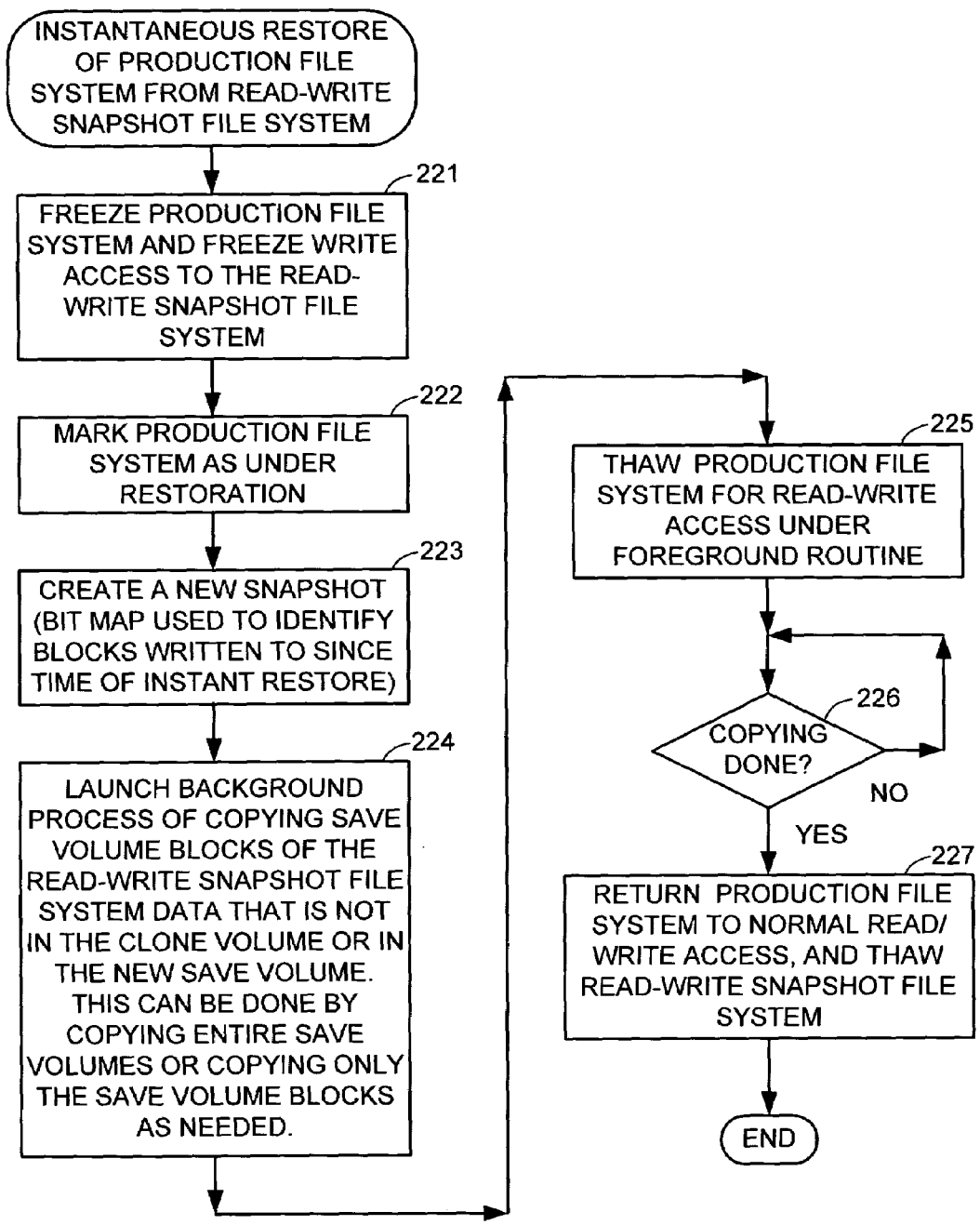
FIG. 20 is a procedure for instantaneous restoration of the production file system from a read-write snapshot of the production file system.

FIG. 20 shows a procedure for instantaneous restoration of the production file system from a specified read-write snapshot of the production file system. At the level of detail shown in FIG. 20, the procedure for restoration of the production file system from a specified read-write snapshot of the production file system similar to the procedure for restoration of the production file system from a specified read-only snapshot of the production file system. In a first step 221, access to the production file system is frozen, and also write access to the read-write snapshot copy is frozen. Current operations upon the production file system and the read-write snapshot copy are completed but servicing of any subsequent access request is temporarily suspended until access to the production file system or the read-write snapshot copy is thawed. In step 222, the production file system is marked as being under restoration. This causes read/write access to the production file system to be modified so that it is performed in accordance with a foreground routine as further described below with reference to FIG. 24. In the next step 223 of FIG. 20, a new snapshot is created. The bit map for the new snapshot is used to identify blocks written to in the production file system since the time of the instantaneous restoration. Moreover, the new snapshot is used to ensure that the restore is persistent on reboot or remount.

In step 224, a background process is launched for copying save volume blocks of the read-write snapshot file system data that is not in the clone volume or in the new save volume. This can be done in an unwinding process by copying all the blocks of a series of the save volumes in the snapshot queue beginning with the most recent save volume (J+K−1) before the save volume (J+K) of the new snapshot created in step 223 and continuing with the next most recent save volumes up to and including a read-only save volume (N), upon which the read-write snapshot copy is based, and finally with the save volume blocks of the read-write snapshot copy with which the production file system is being restored, as further described below with reference to FIG. 21. Alternatively, this can be done by copying only the blocks of the save volume for the read-write snapshot copy and any other save volume blocks as needed, as further described below with reference to FIG. 22. In step 225 the production file system is thawed for read/write access under the foreground routine shown in FIG. 24 and further described below. In step 226, execution is stalled until the copying of step 224 is done. Once the copying is done, execution continues to step 227. In step 227, the production file system is returned to normal read/write access, and the read-write file system is thawed. This completes the top-level procedure for the instantaneous restoration process.

Figure 21:
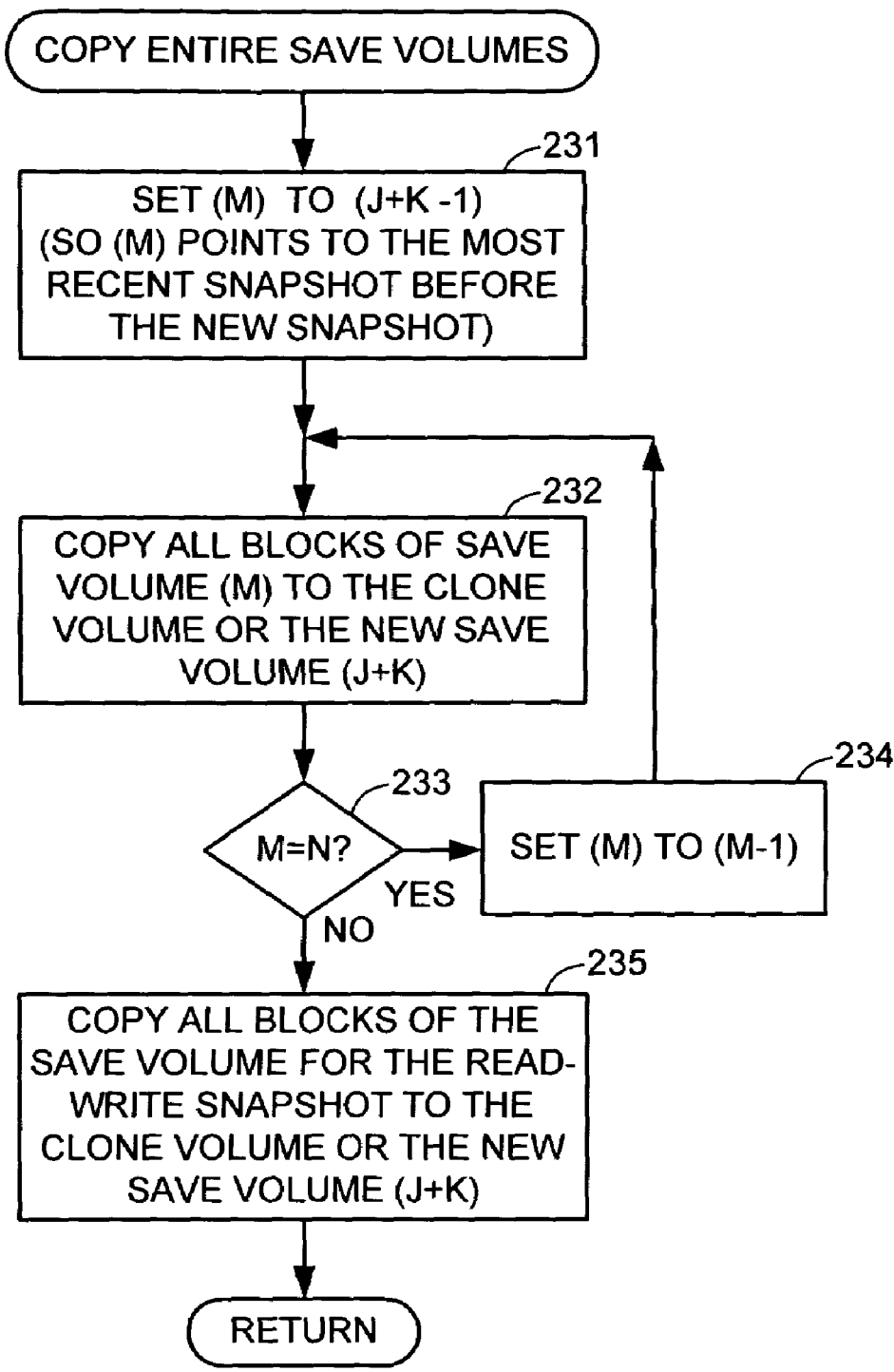
FIG. 21 is a flowchart of a background routine for restoration from a read-write snapshot by copying from save volumes to the clone volume in an unwinding process.

FIG. 21 shows the background routine for copying entire save volumes to the clone volume or the new save volume (J+K) in an unwinding process. In a first step 231 a snapshot pointer (M) is set to (J+K−1) so that the pointer (M) points to the most recent snapshot before the new snapshot (created in step 223 of FIG. 20). Then in step 232, all blocks of the save volume (M) are copied to the clone volume or the new save volume (J+K), as further described below with reference to FIG. 23. (For the case of a save volume shared among a number of snapshot copies, save volume (M) designates the save volume blocks that have been saved for the read-only snapshot (M)). In step 233, execution branches to step 344 if the pointer (M) does not yet point to the snapshot (N) upon which is based the read-write snapshot copy from which the production file system is being restored. In step 234, the pointer (M) is decremented by one. Execution loops back from step 234 to step 232.

In step 233, the routine continues to step 235 if the pointer (M) points to the snapshot (N) upon which is based the read-write snapshot copy from which the production file system is being restored. In step 235, all blocks of the save volume for the read-write snapshot (i.e., the blocks in the save volume that were saved for the read-write snapshot) are copied to the clone volume or the new save volume (J+K).

The unwinding process of FIG. 21 has the disadvantage of possibly copying more than one save volume block corresponding to a single clone volume block. If this occurs, only the last copy operation is needed. The impact of this disadvantage can be minimized by using an efficient method of block copying, such as moving logical-to-physical mapping pointers to the physical storage locations of the data of the blocks. Otherwise, the unnecessary copy operations can be avoided by using an alternative background copy routine shown in FIG. 22.

Figure 22:
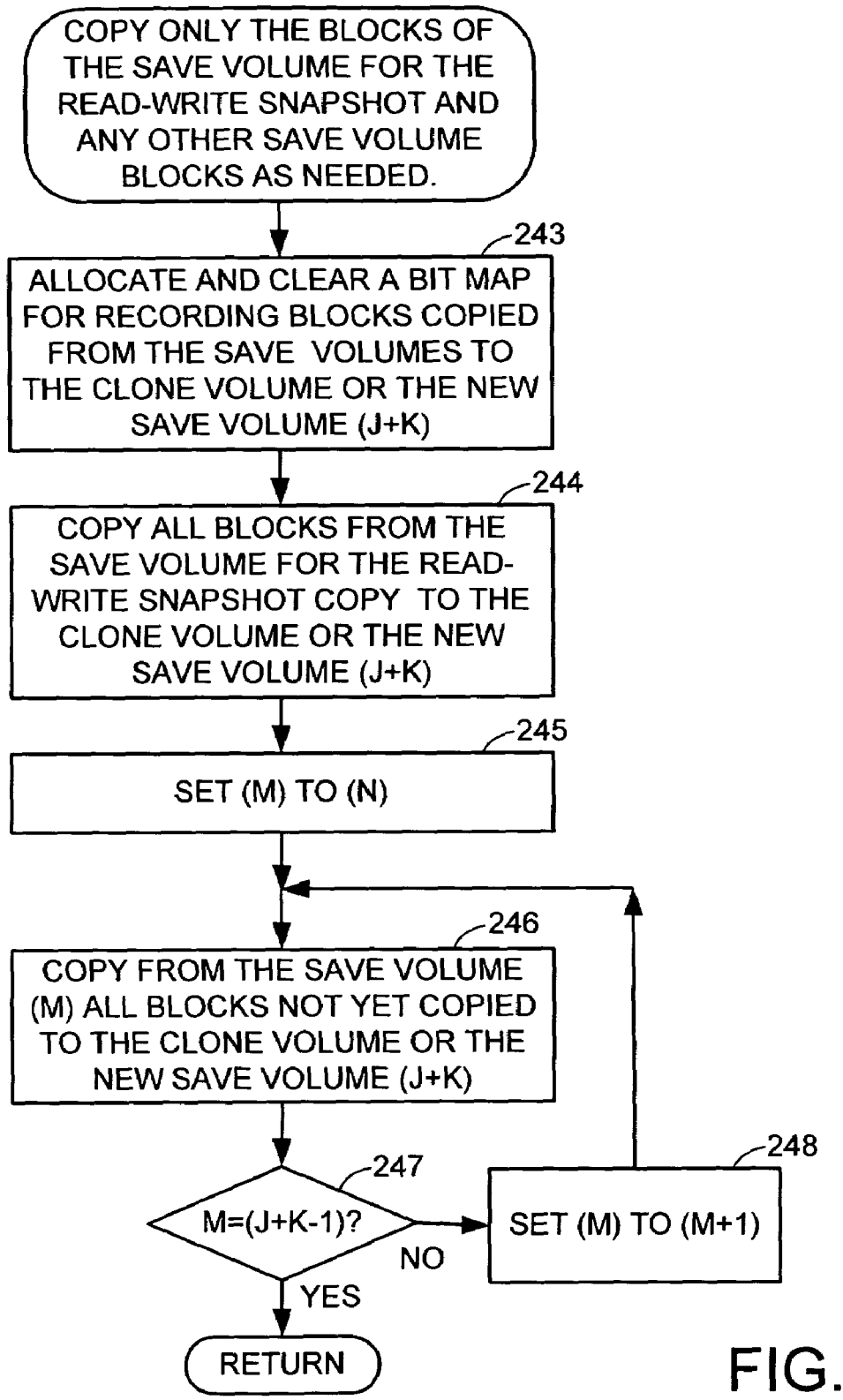
FIG. 22 is a flowchart of a background routine for restoration from a read-write snapshot by copying only the blocks as needed from save volumes to the clone volume.

In a first step 243 of FIG. 22, a bit map is allocated and cleared for recording that blocks have been copied from the save volumes to the clone volume or the new save volume (J+K). In step 244, all blocks are copied from the save volume (N) to the clone volume or the new save volume (J+K), and corresponding bits in the bit map (allocated and cleared in step 243) are set to indicate the blocks that have been copied. In step 245, s snapshot pointer (M) is set to (N). In step 246, all blocks in the save volume (M) not yet copied to the clone volume or the new save volume (J+K) are copied from the save volume (M) to the clone volume or the new save volume (J+K). Step 246 may use a routine similar to the routine described below with reference to FIG. 23, except that the bit map (allocated and cleared in step 243) is tested before a block is copied in order to skip the copying of the block if the corresponding bit in the bit map is set, and after any block is copied, the corresponding bit in the bit map is set to indicate that the block has been copied. In step 247, execution returns if (M) is equal to (J+K−1). Otherwise, execution branches to step 248. In step 248, the pointer (M) is incremented by one, and then execution loops back to step 246.

Figure 23:
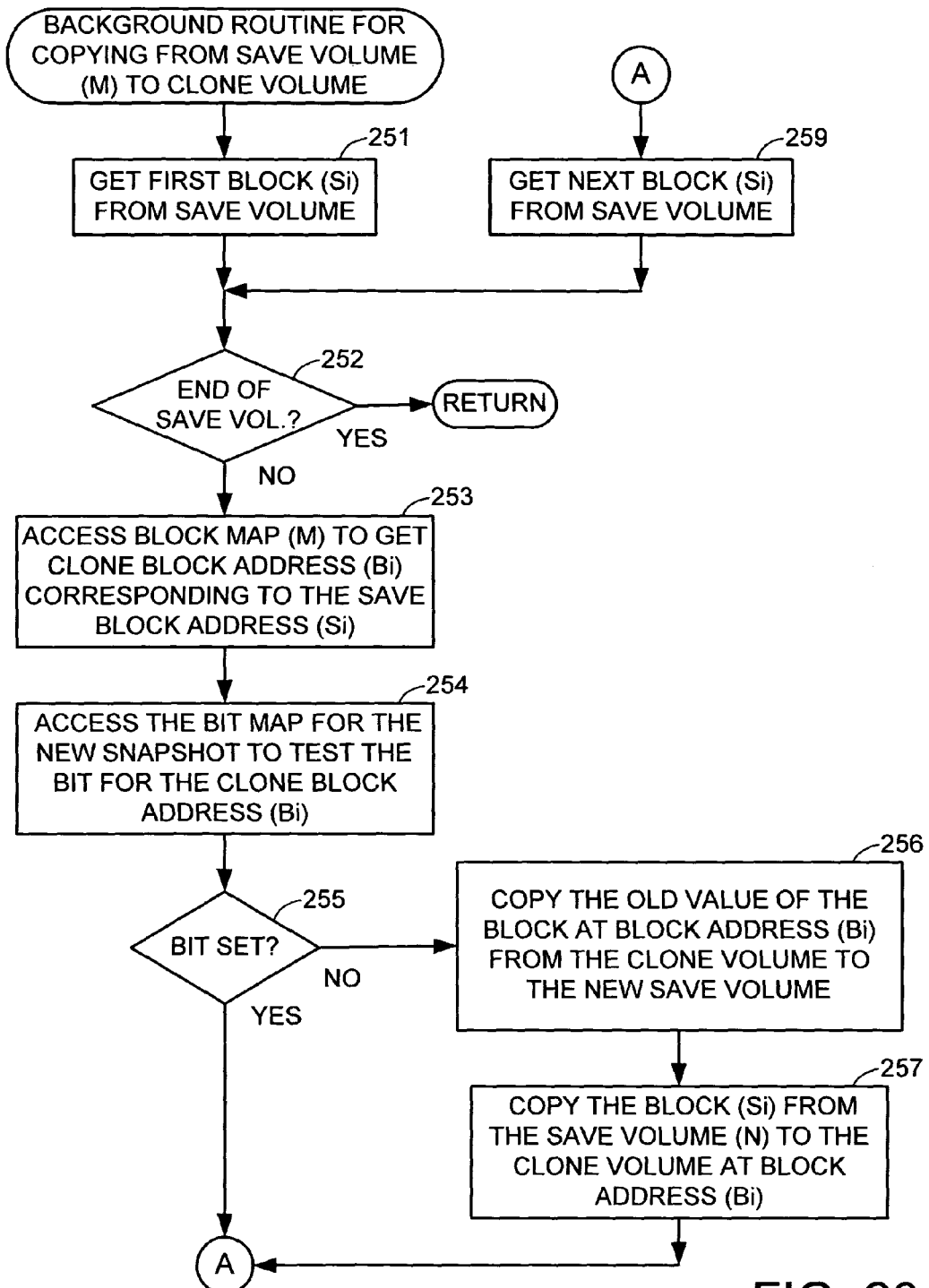
FIG. 23 is a flowchart of a background routine for copying blocks from a specified save volume to the clone volume.

FIG. 23 shows the background routine for copying from the save volume for the snapshot (N) to the clone volume. In a first step 251, a first block (Si) is obtained from the save volume. The blocks can be obtained from the save volume and copied to the clone volume in any order, so it is convenient to copy the save volume blocks in the order in which the save volume block addresses (Si) are found during a scan of the block map for the snapshot (N). Then in step 252, if the end of the save volume has been reached, then the copying process has been completed and execution returns. Otherwise, execution continues from step 252 to step 253. In step 253, the block map for the snapshot (N) is accessed to get the clone block address (Bi) corresponding to the save block address (Si). Then in step 254, the bit map is accessed for the new snapshot to test the bit for the clone block address (Bi). In step 255, if the tested bit is set, then execution continues from step 257 to step 259 to get the next block (Si) from the save volume. Execution loops back from step 259 to step 252.

If in step 255 the tested bit was not set, then execution continues to step 256. In step 256, the old value of the block at block address (Bi) is copied from the clone volume to the new save volume. Then in step 257, the block (Si) is copied from the save volume (N) to the clone volume at the block address (Bi). From step 257, execution continues to step 259. The copying process continues until the end of the save volume is reached in step 252.

Figure 24:
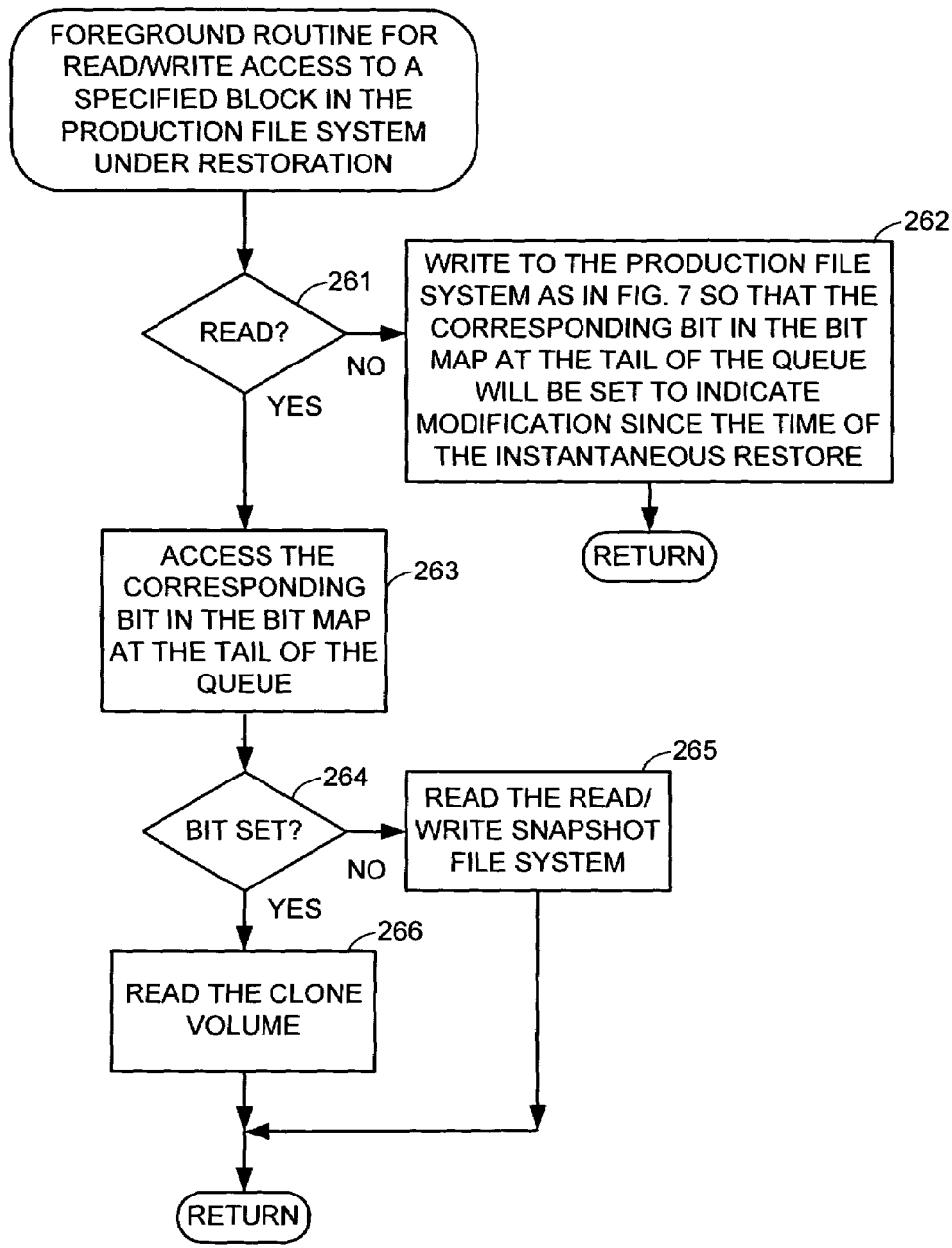
FIG. 24 is a flowchart of a foreground routine for read-write access to a specified data block in the production file system under restoration from a read-write snapshot.

FIG. 24 is a flowchart of a foreground routine for read/write access to a specified block in the production file system under restoration. In a first step 261, execution branches to step 262 for write access to the production file system under restoration. In step 262, the production file system is written to as in FIG. 7 so that the corresponding bit in the bit map at the tail of the snapshot queue will be set to indicate that the corresponding block has been modified since the time of the instantaneous restore operation. After step 262, execution returns.

In step 261, for a read access to the production file system under restoration, execution continues to step 263. In step 263, the corresponding bit is accessed in the bit map at the tail of the snapshot queue. Then in step 264, if the bit is not set, then execution branches to step 265 to read the snapshot file system (N) from which the production file system is being restored. After step 265, execution returns. If in step 264 the bit is set, then execution continues to step 266 to read the clone volume, and then execution returns.

In view of the above, there has been described a file server that maintains a series of read-only snapshot copies of a production file system. A read-write snapshot copy is created based on a selected read-only snapshot copy by maintaining a set of save volume blocks of new data of the read-write snapshot copy. A block of new data is written to the read-write snapshot copy by allocating a save volume block and writing to the save volume block. A bit map is used to indicate blocks of the read-write snapshot copy that have respective allocated save volume blocks, and a block map is used to indicate the save volume address for each such block. A specified block is read from the read-write snapshot copy by checking whether there is a respective save volume block allocated to the specified block, and if so, reading from the respective save volume block, and if not, reading from the read-only snapshot copy upon which the read-write snapshot copy is based. The read-write snapshot copy can be refreshed with a specified read-only snapshot copy, or with a newly created read-only snapshot copy of the production file system. The production file can be restored with a specified read-write snapshot copy.

What is claimed is:

1. A computer-implemented method of operating a file server said method comprising the steps of:
   creating and maintaining, in computer data storage, a read-write snapshot copy of a production file system, the read-write snapshot copy of the production file system being created and maintained by:
   a) creating a read-only snapshot copy of the production file system; and
   b) creating a read-write snapshot copy of the production file system based on the read-only snapshot copy of the production file system, and maintaining the read-write snapshot copy of the production file system by maintaining a set of save volume blocks of new data of the read-write snapshot copy of the production file system, and
      (i) writing to a first specified block of the read-write snapshot copy of the production file system by writing to a respective save volume block allocated to the first specified block of the read-write snapshot copy of the production file system,
      (ii) reading from a second specified block of the read-write snapshot copy of the production file system by checking whether there is a respective save volume block allocated to the second specified block of the read-write snapshot copy of the production file system, and upon finding that there is a respective save volume block allocated to the second specified block of the read-write snapshot copy of the production file system, reading from the respective save volume block found to be allocated to the second specified block of the read-write snapshot copy of the production file system, and
      (iii) reading from a third specified block of the read-write snapshot copy of the production file system by checking whether there is a respective save volume block allocated to the third specified block of the read-write snapshot copy of the production file system, and upon finding that there is not a respective save volume block allocated to the third specified block of the read-write snapshot copy of the production file system, reading the third specified block of the read-write snapshot copy of the production file system by reading from the read-only snapshot copy of the production file system.

2. The computer-implemented method as claimed in claim 1, wherein the respective save volume block allocated to the first specified block of the read-write snapshot copy of the production file system is allocated in response to the file server receiving a request from a client for writing to the first specified block of the read-write snapshot copy of the production file system.

3. The computer-implemented method as claimed in claim 1, which includes the file server maintaining a bit map for indicating whether or not respective blocks of the read-write snapshot copy of the production volume have new data residing in save volume blocks, and maintaining a block map for indicating respective save volume addresses of blocks of new data of the read-write snapshot copy of the production file system.

4. The computer-implemented method as claimed in claim 1, which includes creating and maintaining more than one read-write snapshot copy of the production file system based on the read-only snapshot copy of the production file system.

5. The computer-implemented method as claimed in claim 1, wherein the read-write snapshot copy of the production file system has a file system identifier, and which includes refreshing the read-write snapshot copy of the production file system by freezing access to the read-write snapshot copy of the production file system, de-allocating the set of save volume blocks for storing new data of the read-write snapshot copy of the production file system, creating a new read-only snapshot copy of the production file system, creating a new read-write snapshot copy of the production file system based on the new read-only snapshot copy of the production file system, and assigning the file system identifier to the new read-write snapshot copy of the production file system.

6. The computer-implemented method as claimed in claim 1, which includes restoring the production file system from the read-write snapshot copy of the production file system by freezing the production file system, marking the production file system as being under restoration, creating a new read-only snapshot copy of the production file system including a new set of save volume blocks and a new bitmap for identifying blocks written to the production file system since the time of restoring the production file system from the read-write snapshot copy of the production file system, launching a background process of copying, either to the production file system or to the new set of save volume blocks as indicated by the new bitmap, save volume blocks of data of the read-write snapshot copy of the production file system, thawing the production file system to permit read-write access of the production file system under a foreground routine, and when the background process is done, returning the production file system to normal read-write access.

7. A computer-implemented method of operating a file server for providing access to a production file system in computer data storage and access to a read-write snapshot copy of the production file system in the computer data storage, said method comprising:

the file server maintaining, in the computer data storage, a clone volume of blocks in the production file system, a set of save volume blocks of old data from the production file system, and a set of save volume blocks of new data of the read-write snapshot copy file system, the file server writing new data to a first specified block in the production file system by copying old data from the first specified block in the clone volume to a save volume block and then writing to the first specified block in the clone volume, the file server reading a second specified block of the production file system by reading the second specified block from the clone volume, the file server writing new data to a third specified block in the read-write snapshot copy of the production file system by writing to a save volume block, and the file server reading a fourth specified block from the read-write snapshot copy of the production file system by checking whether the fourth specified block is found in the set of save volume blocks of new data of the read-write snapshot copy of the production file system, and upon finding that the fourth specified block is found in the set of save volume blocks of new data of the read-write snapshot copy of the production file system, reading the fourth specified block from the set of save volume blocks of new data of the read-write snapshot copy of the production file system.

8. The computer-implemented method as claimed in claim 7, which includes the file server reading a fifth specified block from the read-write snapshot copy of the production file system by checking whether the fifth specified block is found in the set of save volume blocks of new data of the read-write snapshot copy of the production file system, and upon finding that the fifth specified block is not found in the set of save volume blocks of new data of the read-write snapshot copy of the production file system, checking whether the fifth specified block is found in the set of save volume blocks of old data from the production file system, and upon finding that the fifth specified block is found in the set of save volume blocks of old data from the production file system, reading the fifth specified block from the set of save volume blocks of old data from the production file system.

9. The computer-implemented method as claimed in claim 7, which includes the file server reading a sixth specified block from the read-write snapshot copy of the production file system by checking whether the sixth specified block is found in the set of save volume blocks of new data of the read-write snapshot copy of the production file system, and upon finding that the sixth specified block is not found in the set of save volume blocks of new data of the read-write snapshot copy of the production file system, checking whether the sixth specified block is found in the set of save volume blocks of old data from the production file system, and upon finding that the sixth specified block is not found in the set of save volume blocks of old data from the production file system, reading the sixth specified block from the clone volume.

10. The computer-implemented method as claimed in claim 7, which includes the file server storing, in a shared save volume, the set of save volume blocks of old data from the production file system and the set of save volume blocks of new data of the read-write snapshot copy of the production file system.

11. The computer-implemented method as claimed in claim 7, which includes the file server maintaining a first bit map for indicating whether or not respective blocks of the production volume have old data residing in the set of save volume blocks for storing old data from the production file system, maintaining a first block map for indicating respective save volume addresses of blocks of old data from the production file system, maintaining a second bit map for indicating whether or not respective blocks of the read-write snapshot copy of the production volume have new data residing in the set of save volume blocks of new data of the read-write snapshot copy of the production volume, and maintaining a second block map for indicating respective save volume addresses of blocks of new data of the read-write snapshot copy of the production file system.

12. The computer-implemented method as claimed in claim 7, wherein the read-write snapshot copy of the production file system has a file system identifier, and wherein the file server refreshes the read-write snapshot copy of the production file system by freezing access to the read-write snapshot copy of the production file system, de-allocating the set of save volume blocks for storing new data of the read-write snapshot copy of the production file system, creating a new read-only snapshot copy of the production file system, creating a new read-write snapshot copy of the production file system based on the new read-only snapshot copy of the production file system, and assigning the file system identifier to the new read-write snapshot copy of the production file system.

13. The computer-implemented method as claimed in claim 7, which includes the file server restoring the production file system from the read-write snapshot copy of the production file system by freezing the production file system, marking the production file system as being under restoration, creating a new read-only snapshot copy of the production file system including a new save volume and a new bitmap for identifying blocks written to the production file system since the time of restoring the production file system from the read-write snapshot copy of the production file system, launching a background process of copying, to either the clone volume or to the new save volume as indicated by respective bits in the new bitmap, save volume blocks of data of the read-write snapshot copy of the production file system that are not in the clone volume or in the new save volume, thawing the production file system to permit read-write access of the production file system under a foreground routine, and when the background process is done, returning the production file system to normal read-write access.

14. The computer-implemented method as claimed in claim 13, which includes the file server performing the background process of copying save volume blocks by first copying the set of save volume blocks of old data from the production file system to either the clone volume or to the new save volume as indicated by respective bits in the new bitmap, and then copying the set of save volume blocks of new data of the read-write snapshot copy of the production file system to either the clone volume or to the new save volume as indicated by respective bits in the new bitmap.

15. The computer-implemented method as claimed in claim 13, which includes file server performing the background process of copying save volume blocks by first copying the set of save volume blocks of new data of the read-write snapshot copy of the production file system to either the clone volume or to the new save volume as indicated by respective bits in the new bitmap, and then, for production file system blocks not already copied from the set of save volume blocks of new data of the read-write snapshot copy of the production file system to either the clone volume or to the new save volume as indicated by respective bits in the new bitmap, copying save volume blocks of old data from the production file system to either the clone volume or to the new save volume as indicated by respective bits in the new bitmap.

16. A file server comprising:
computer data storage;
means for storing a production file system in the computer data storage;
means for creating and maintaining, in the computer data storage, a series of read-only snapshot copies of the production file system; and
means for creating and maintaining, in the computer data storage, read-write snapshot copies of the production file system, each of the read-write snapshot copies of the production file system being based on a respective one of the read-only snapshot copies of the production file system.

17. The file server as claimed in claim 16, which includes means for refreshing a selected read-write snapshot copy of the production file system with a specified read-only snapshot copy of the production file system.

18. The file server as claimed in claim 16, which includes means for refreshing a selected read-write snapshot copy of the production file system by creating a new read-only snapshot copy of the production file system and refreshing the selected read-write snapshot copy of the production file system with the new read-only snapshot copy of the production file system.

19. The file server as claimed in claim 16, which includes means for restoring the production file system from a specified read-write snapshot copy of the production file system.

20. A file server comprising computer data storage,
wherein the file server is programmed for storing a production file system in the computer data storage, for creating and maintaining, in the computer data storage, a read-write snapshot copy of a production file system,
wherein the file server is programmed for creating and maintaining the read-write snapshot copy of the production file system by creating a read-only snapshot copy of the production file system, creating the read-write snapshot copy of the production file system based on the read-only snapshot copy of the production file system, and maintaining the read-write snapshot copy of the production file system by maintaining a set of save volume blocks of new data of the read-write snapshot copy of the production file system,
wherein the file server is programmed for writing to a first specified block of the read-write snapshot copy of the production file system by writing to a respective save volume block allocated to the first specified block of the read-write snapshot copy of the production file system,
wherein the file server is programmed for reading from a second specified block of the read-write snapshot copy of the production file system by checking whether there is a respective save volume block allocated to the second specified block of the read-write snapshot copy of the production file system, and upon finding that there is a respective save volume block allocated to the second specified block of the read-write snapshot copy of the production file system, reading from the respective save volume block found to be allocated to the second specified block of the read-write snapshot copy of the production file system, and
wherein the file server is programmed for reading from a third specified block of the read-write snapshot copy of the production file system by checking whether there is a respective save volume block allocated to the third specified block of the read-write snapshot copy of the production file system, and upon finding that there is not a respective save volume block allocated to the third specified block of the read-write snapshot copy of the production file system, reading the third specified block of the read-write snapshot copy of the production file system by reading from the read-only snapshot copy of the production file system.

21. The file server as claimed in claim 20, which is programmed for allocating the respective save volume block to the first specified block of the read-write snapshot copy of the production file system in response to the file server receiving a request from a client for writing to the first specified block of the read-write snapshot copy of the production file system.

22. The file server as claimed in claim 20, wherein the file server is programmed for maintaining a bit map for indicating whether or not respective blocks of the read-write snapshot copy of the production volume have new data residing save volume blocks, and for maintaining a block map for indicating respective save volume addresses of blocks of new data of the read-write snapshot copy of the production file system.

23. The file server as claimed in claim 20, which is programmed for creating and maintaining more than one read-write snapshot copy of the production file system based on the read-only snapshot copy of the production file system.

24. The file server as claimed in claim 20, wherein the read-write snapshot copy of the production file system has a file system identifier, and wherein the file server is programmed for refreshing the read-write snapshot copy of the production file system by freezing access to the read-write snapshot copy of the production file system, de-allocating the set of save volume blocks for storing new data of the read-write snapshot copy of the production file system, creating a new read-only snapshot copy of the production file system, creating a new read-write snapshot copy of the production file system based on the new read-only snapshot copy of the production file system, and assigning the file system identifier to the new read-write snapshot copy of the production file system.

25. The file server as claimed in claim 20, which is programmed for restoring the production file system from the read-write snapshot copy of the production file system by freezing the production file system, marking the production file system as being under restoration, creating a new read-only snapshot copy of the production file system including a new set of save volume blocks and a new bitmap for identifying blocks written to the production file system since the time of restoring the production file system from the read-write snapshot copy of the production file system, launching a background process of copying, either to the production file system or to the new set of save volume blocks as indicated by the new bitmap, save volume blocks of data of the read-write snapshot copy of the production file system, thawing the production file system to permit read-write access of the production file system under a foreground routine, and when the background process is done, returning the production file system to normal read-write access.

26. A file server comprising computer data storage, the computer data storage containing a production file system and a read-write snapshot copy of the production file system;

the file server being programmed for providing access to the production file system and access to the read-write snapshot copy of the production file system, the file server being programmed to maintain, in the computer data storage, a clone volume of blocks in the production file system, a set of save volume blocks of old data from the production file system, and a set of save volume blocks of new data of the read-write snapshot copy file system, the file server being programmed to write new data to a first specified block in the production file system by copying old data from the first specified block in the clone volume to a save volume block and then writing to the first specified block in the clone volume, the file server being programmed to read a second specified block of the production file system by reading the second specified block from the clone volume, the file server being programmed to write new data to a third specified block in the read-write snapshot copy of the production file system by writing to a save volume block, and the file server being programmed to read a fourth specified block from the read-write snapshot copy of the production file system by checking whether the fourth specified block is found in the set of save volume blocks of new data of the read-write snapshot copy of the production file system, and if so, reading the fourth specified block from the set of save volume blocks of new data of the read-write snapshot copy of the production file system, and if not, checking whether the fourth specified block is found in the set of save volume blocks of old data from the production file system, and if so, reading the fourth specified block from the set of save volume blocks of old data from the production file system, and if not, reading the fourth specified block from the clone volume.

27. The file server as claimed in claim 26, wherein the set of save volume blocks of old data from the production file system and the set of save volume blocks of new data of the read-write snapshot copy of the production file system are contained in a shared save volume.

28. The file server as claimed in claim 26, which is programmed for maintaining a first bit map for indicating whether or not respective blocks of the production volume have old data residing in the set of save volume blocks for storing old data from the production file system, maintaining a first block map for indicating respective save volume addresses of blocks of old data from the production file system, maintaining a second bit map for indicating whether or not respective blocks of the read-write snapshot copy of the production volume have new data residing in the set of save volume blocks of new data of the read-write snapshot copy of the production volume, and maintaining a second block map for indicating respective save volume addresses of blocks of new data of the read-write snapshot copy of the production file system.

29. The file server as claimed in claim 26, wherein the read-write snapshot copy of the production file system has a file system identifier, and wherein the file server is programmed for refreshing the read-write snapshot copy of the production file system by freezing access to the read-write snapshot copy of the production file system, de-allocating the set of save volume blocks for storing new data of the read-write snapshot copy of the production file system, creating a new read-only snapshot copy of the production file system, creating a new read-write snapshot copy of the production file system based on the new read-only snapshot copy of the production file system, and assigning the file system identifier to the new read-write snapshot copy of the production file system.

30. The file server as claimed in claim 26, wherein the file server is programmed for restoring the production file system from the read-write snapshot copy of the production file system by freezing the production file system, marking the production file system as being under restoration, creating a new read-only snapshot copy of the production file system including a new save volume and a new bitmap for identifying blocks written to the production file system since the time of restoring the production file system from the read-write snapshot copy of the production file system, launching a background process of copying, to either the clone volume or to the new save volume as indicated by respective bits in the new bitmap, save volume blocks of data of the read-write snapshot copy of the production file system that are not in the clone volume or in the new save volume, thawing the production file system to permit read-write access of the production file system under a foreground routine, and when the background process is done, returning the production file system to normal read-write access.

31. The file server as claimed in claim 30, wherein the file server is programmed to perform the background process of copying save volume blocks by first copying the set of save volume blocks of old data from the production file system to either the clone volume or to the new save volume as indicated by respective bits in the new bitmap, and then copying the set of save volume blocks of new data of the read-write snapshot copy of the production file system to either the clone volume or to the new save volume as indicated by respective bits in the new bitmap.

32. The file server as claimed in claim 30, wherein the file server is programmed to perform the background process of copying save volume blocks by first copying the set of save volume blocks of new data of the read-write snapshot copy of the production file system to either the clone volume or to the new save volume as indicated by respective bits in the new bitmap, and then, for production file system blocks not already copied from the set of save volume blocks of new data of the read-write snapshot copy of the production file system to either the clone volume or to the new save volume as indicated by respective bits in the new bitmap, copying save volume blocks of old data from the production file system to either the clone volume or to the new save volume as indicated by respective bits in the new bitmap.

* * * * *